(12) United States Patent
Abotabl et al.

(10) Patent No.: US 12,213,073 B2
(45) Date of Patent: Jan. 28, 2025

(54) USER EQUIPMENT ASSISTANCE INFORMATION AND BUFFER STATUS REPORT EXTENSION FOR GREEN NETWORKS

(71) Applicant: QUALCOMM Incorporated, San Diego, CA (US)

(72) Inventors: Ahmed Attia Abotabl, San Diego, CA (US); Ahmed Elshafie, San Diego, CA (US); Hung Dinh Ly, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 474 days.

(21) Appl. No.: 17/721,201

(22) Filed: Apr. 14, 2022

(65) Prior Publication Data

US 2023/0337136 A1    Oct. 19, 2023

(51) Int. Cl.
*H04W 52/02* (2009.01)
*H04W 72/1263* (2023.01)
*H04W 72/21* (2023.01)

(52) U.S. Cl.
CPC ... *H04W 52/0235* (2013.01); *H04W 52/0216* (2013.01); *H04W 72/1263* (2013.01); *H04W 72/21* (2023.01)

(58) Field of Classification Search
None
See application file for complete search history.

(56) References Cited

U.S. PATENT DOCUMENTS

| | | | |
|---|---|---|---|
| 12,101,716 B2* | 9/2024 | Li | H04W 52/367 |
| 2013/0242726 A1 | 9/2013 | Zhu et al. | |
| 2020/0154354 A1 | 5/2020 | Awoniyi-Oteri et al. | |
| 2023/0388928 A1 | 11/2023 | Khalfi et al. | |

OTHER PUBLICATIONS

International Search Report and Written Opinion—PCT/US2023/065315—ISA/EPO—Jul. 24, 2023 (2201642WO).

* cited by examiner

*Primary Examiner* — Gary Lafontant
(74) *Attorney, Agent, or Firm* — Holland & Hart LLP

(57) ABSTRACT

Methods, systems, and devices for wireless communications are described. A user equipment (UE) may transmit one or more messages indicating a first time period having a duration prior to expected traffic being available for transmission at the UE, and indicating a size associated with the expected traffic (e.g., a quantity of bits). In some examples, the one or more messages may include a UE assistance information (UAI) message or a buffer status report (BSR) message. The UE may receive a response message based on the one or more messages indicating that a network entity is to enter a sleep mode during a second time period based on the first time period and the size associated with the expected traffic. In some examples, the network entity may enter the sleep mode based on the first time period and the size associated with the expected traffic.

30 Claims, 19 Drawing Sheets

USER EQUIPMENT ASSISTANCE INFORMATION AND BUFFER STATUS REPORT EXTENSION FOR GREEN NETWORKS

FIELD OF TECHNOLOGY

The following relates to wireless communications, including user equipment (UE) assistance information (UAI) and buffer status report (BSR) extension for green networks.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support user equipment (UE) assistance information (UAI) and buffer status report (BSR) extension for green networks. For example, the described techniques provide for a UE to transmit information about expected traffic for the UE to a network entity. Such information may assist the network entity in determining whether to activate or enter a sleep mode for one or more components of the network entity. In some examples, the UE may transmit one or more messages to the network entity indicating a duration of time before expected traffic may be available for transmission at the UE and an expected size (e.g., quantity of bits) associated with the expected traffic. The one or more messages may include a UAI message or a BSR message. In some cases, the UE may receive a control message indicating a configuration for a field of a BSR associated with the expected traffic and the UE may transmit a BSR indicating the duration of time, the size of the associated traffic, or both, based on the configuration. In some examples, the UE may receive a response message from the network entity indicating that the network entity is to enter a sleep mode during a time period based on the duration of time and the size of the associated traffic (e.g., as indicated by the BSR).

A method for wireless communication at a UE is described. The method may include transmitting one or more messages indicating a first time period, the first time period including a duration prior to expected traffic being available for transmission at the UE, the one or more messages indicating a size associated with the expected traffic and receiving a response message based on the one or more messages, the response message indicating that a network entity is to enter a sleep mode during a second time period based on the first time period and the size associated with the expected traffic.

An apparatus for wireless communication at a UE is described. The apparatus may include a processor, memory coupled with the processor, and instructions stored in the memory. The instructions may be executable by the processor to cause the apparatus to transmit one or more messages indicating a first time period, the first time period including a duration prior to expected traffic being available for transmission at the UE, the one or more messages indicating a size associated with the expected traffic and receive a response message based on the one or more messages, the response message indicating that a network entity is to enter a sleep mode during a second time period based on the first time period and the size associated with the expected traffic.

Another apparatus for wireless communication at a UE is described. The apparatus may include means for transmitting one or more messages indicating a first time period, the first time period including a duration prior to expected traffic being available for transmission at the UE, the one or more messages indicating a size associated with the expected traffic and means for receiving a response message based on the one or more messages, the response message indicating that a network entity is to enter a sleep mode during a second time period based on the first time period and the size associated with the expected traffic.

A non-transitory computer-readable medium storing code for wireless communication at a UE is described. The code may include instructions executable by a processor to transmit one or more messages indicating a first time period, the first time period including a duration prior to expected traffic being available for transmission at the UE, the one or more messages indicating a size associated with the expected traffic and receive a response message based on the one or more messages, the response message indicating that a network entity is to enter a sleep mode during a second time period based on the first time period and the size associated with the expected traffic.

In some examples of the method, apparatuses, and non-transitory computer-readable medium described herein, transmitting the one or more messages may include operations, features, means, or instructions for transmitting a UAI message including an indication of the first time period, the size associated with the expected traffic, or both.

Some examples of the method, apparatuses, and non-transitory computer-readable medium described herein may further include operations, features, means, or instructions for receiving a control message indicating a configuration for a field of a BSR associated with the expected traffic.

Some examples of the method, apparatuses, and non-transitory computer-readable medium described herein may further include operations, features, means, or instructions for transmitting a BSR message based on the configuration, the field of the BSR including an indication of the first time period, the size associated with the expected traffic, or both.

Some examples of the method, apparatuses, and non-transitory computer-readable medium described herein may further include operations, features, means, or instructions for receiving a control message indicating one or more parameters associated with the expected traffic, the one or more parameters including a BSR extension value, an expected time period prior to the expected traffic being available for transmission at the UE, a quantity of bits expected in the expected traffic, or any combination thereof.

In some examples of the method, apparatuses, and non-transitory computer-readable medium described herein, transmitting the one or more messages may include operations, features, means, or instructions for transmitting a first message that indicates both the first time period and the size associated with the expected traffic.

In some examples of the method, apparatuses, and non-transitory computer-readable medium described herein, transmitting the one or more messages may include operations, features, means, or instructions for transmitting a first message indicating the first time period and transmitting a second message indicating the size associated with the expected traffic.

Some examples of the method, apparatuses, and non-transitory computer-readable medium described herein may further include operations, features, means, or instructions for detecting an arrival time associated with the expected traffic, where the first time period may be based on the arrival time.

Some examples of the method, apparatuses, and non-transitory computer-readable medium described herein may further include operations, features, means, or instructions for performing one or more power saving procedures based on receiving the response message.

In some examples of the method, apparatuses, and non-transitory computer-readable medium described herein, the size associated with the expected traffic indicates an expected quantity of bits associated with the expected traffic.

A method for wireless communication at a network entity is described. The method may include receiving one or more messages indicating a first time period, the first time period including a duration prior to expected traffic being available for transmission at a UE, the one or more messages indicating a size associated with the expected traffic, transmitting a response message based on the one or more messages, the response message indicating that the network entity is to enter a sleep mode during a second time period based on the first time period and the size associated with the expected traffic, and entering the sleep mode based on the first time period and the size associated with the expected traffic.

An apparatus for wireless communication at a network entity is described. The apparatus may include a processor, memory coupled with the processor, and instructions stored in the memory. The instructions may be executable by the processor to cause the apparatus to receive one or more messages indicating a first time period, the first time period including a duration prior to expected traffic being available for transmission at a UE, the one or more messages indicating a size associated with the expected traffic, transmit a response message based on the one or more messages, the response message indicating that the network entity is to enter a sleep mode during a second time period based on the first time period and the size associated with the expected traffic, and enter the sleep mode based on the first time period and the size associated with the expected traffic.

Another apparatus for wireless communication at a network entity is described. The apparatus may include means for receiving one or more messages indicating a first time period, the first time period including a duration prior to expected traffic being available for transmission at a UE, the one or more messages indicating a size associated with the expected traffic, means for transmitting a response message based on the one or more messages, the response message indicating that the network entity is to enter a sleep mode during a second time period based on the first time period and the size associated with the expected traffic, and means for entering the sleep mode based on the first time period and the size associated with the expected traffic.

A non-transitory computer-readable medium storing code for wireless communication at a network entity is described. The code may include instructions executable by a processor to receive one or more messages indicating a first time period, the first time period including a duration prior to expected traffic being available for transmission at a UE, the one or more messages indicating a size associated with the expected traffic, transmit a response message based on the one or more messages, the response message indicating that the network entity is to enter a sleep mode during a second time period based on the first time period and the size associated with the expected traffic, and enter the sleep mode based on the first time period and the size associated with the expected traffic.

Some examples of the method, apparatuses, and non-transitory computer-readable medium described herein may further include operations, features, means, or instructions for receiving one or more additional messages from a second UE, the one or more additional messages including an indication of a third time period prior to second expected traffic being available for transmission at the second UE.

Some examples of the method, apparatuses, and non-transitory computer-readable medium described herein may further include operations, features, means, or instructions for determining to enter the sleep mode during the second time period based on the one or more messages and the one or more additional messages.

In some examples of the method, apparatuses, and non-transitory computer-readable medium described herein, receiving the one or more messages may include operations, features, means, or instructions for receiving a UAI message including an indication of the first time period, the size associated with the expected traffic, or both.

Some examples of the method, apparatuses, and non-transitory computer-readable medium described herein may further include operations, features, means, or instructions for receiving a control message indicating a configuration for a field of a BSR associated with the expected traffic.

Some examples of the method, apparatuses, and non-transitory computer-readable medium described herein may further include operations, features, means, or instructions for receiving a BSR message based on the configuration, the field of the BSR indicating the first time period prior to the expected traffic being available for transmission at the UE, the size associated with the expected traffic, or both.

Some examples of the method, apparatuses, and non-transitory computer-readable medium described herein may further include operations, features, means, or instructions for transmitting a control message indicating one or more parameters associated with the expected traffic, the one or more parameters including a BSR extension value, an expected time period prior to the expected traffic being available for transmission at the UE, a quantity of bits expected in the expected traffic, or any combination thereof.

In some examples of the method, apparatuses, and non-transitory computer-readable medium described herein, receiving the one or more messages may include operations, features, means, or instructions for receiving a first message that indicates both the first time period and the size associated with the expected traffic.

In some examples of the method, apparatuses, and non-transitory computer-readable medium described herein, receiving the one or more messages may include operations, features, means, or instructions for receiving a first message indicating the first time period and receiving a second message indicating the size associated with the expected traffic.

In some examples of the method, apparatuses, and non-transitory computer-readable medium described herein, the size associated with the expected traffic indicates an expected quantity of bits associated with the expected traffic.

DETAILED DESCRIPTION

Figure 1:
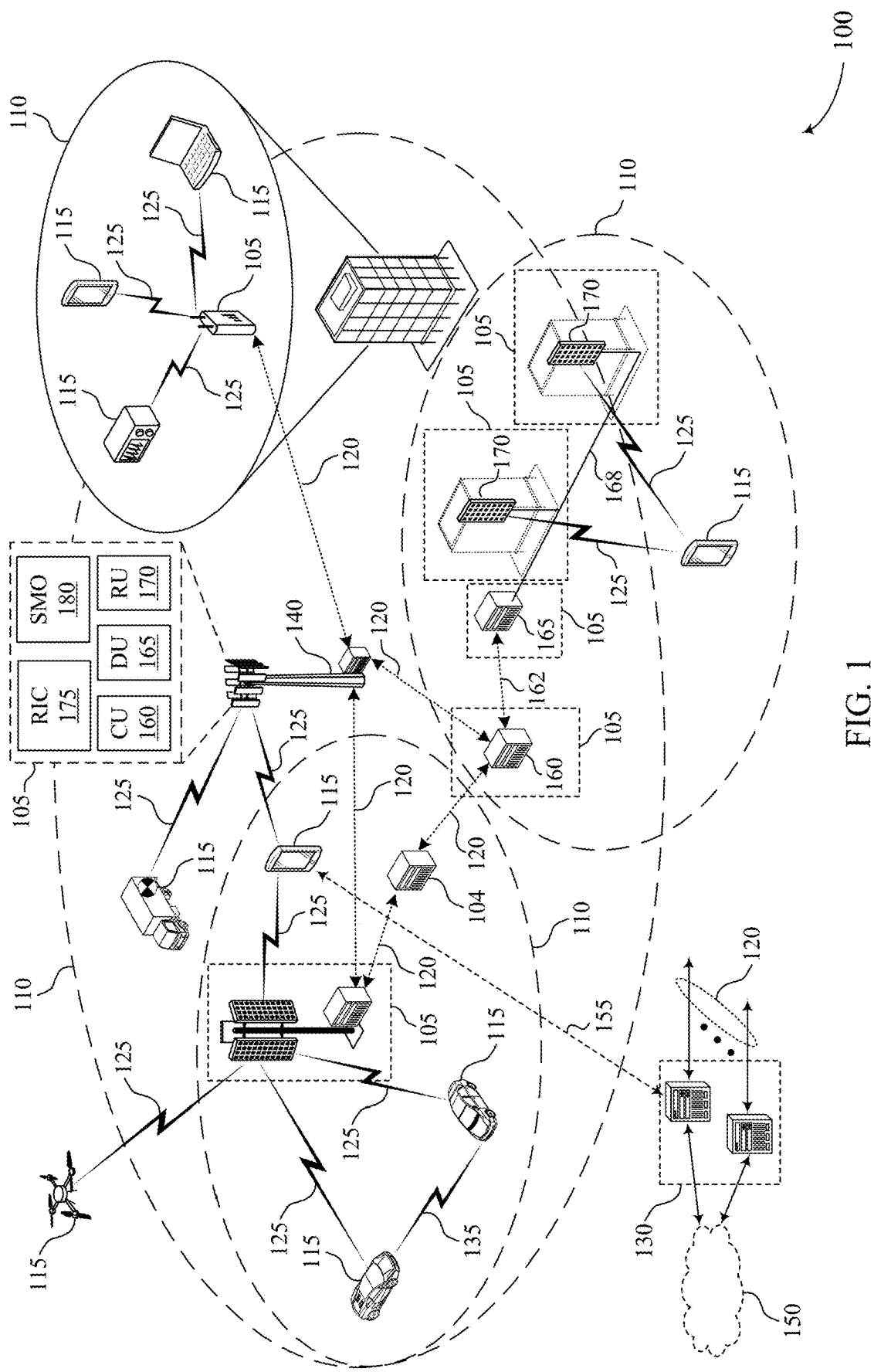
FIG. 1 illustrates an example of a wireless communications system that supports user equipment (UE) assistance information (UAI) and buffer status report (BSR) extension for green networks in accordance with one or more aspects of the present disclosure.

In some examples, a network entity may enter different sleep modes or activate different sleep modes for one or more components of the network entity to save power and maintain operations in a wireless communications system. Depending on traffic conditions corresponding to one or more user equipments (UEs), the network entity may enter different sleep modes, for which the network entity may use different transition times and consume different amounts of power. For example, the network entity may enter a light sleep mode, which may correspond to some power savings and a relatively short transition time between the light sleep mode and an active or awake mode. In some examples, the network entity may enter a deep sleep mode, which may correspond to higher power savings compared to the light sleep mode, but the transition time between deep sleep mode and the active or awake mode is longer than the transition time for light sleep mode. The network entity, however, may be unaware of traffic conditions or expected traffic at UEs supported by the network entity, and may therefore be unable to select a suitable sleep mode and a corresponding time to enter the sleep mode, which may result in increased power consumption or failed transmissions (e.g., if the network entity may enters a sleep mode while UE or network traffic is heavy or if the network entity refrains from entering a sleep mode while UE or network traffic is light).

The techniques described herein enable a UE to transmit a message to a network entity, where the message includes information about expected traffic for transmission by the UE. Such information may assist the network entity in determining whether to enter or activate a particular sleep mode for one or more components of the network entity. In some examples, the UE may transmit one or more messages to the network entity indicating a duration of time before expected traffic may be available for transmission at the UE and an expected size (e.g., quantity of bits) associated with the expected traffic. The one or more messages may include a UE assistance information (UAI) message or a buffer status report (BSR) message. For example, the UE may receive a control message indicating a configuration for a field of a BSR associated with the expected traffic and the UE may transmit a BSR indicating the duration of time, the size of the associated traffic, or both, based on the configuration. In some examples, the UE may receive a response message from the network entity indicating that the network entity is to enter or activate a sleep mode, a type of sleep mode, a time period during which the sleep mode is activated, or any combination thereof based on the duration of time and the size of the associated traffic. For example, if the duration of time before the expected traffic is available for transmission at the UE is a given factor greater than the transition time for entering light sleep mode or deep sleep mode, the UE may receive a response message indicating that the network entity is to enter the sleep mode for a given duration of time, and the network entity may enter or activate the sleep mode accordingly.

Aspects of the disclosure are initially described in the context of wireless communications systems. Aspects of the disclosure are then described in the context of timelines, MAC control elements (MAC-CEs), and process flows. Aspects of the disclosure are further illustrated by and described with reference to apparatus diagrams, system diagrams, and flowcharts that relate to UAI and BSR extension for green networks.

FIG. 1 illustrates an example of a wireless communications system 100 that supports UAI and BSR extension for green networks in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a fifth generation (5G) NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support UAI and BSR extension for green networks as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

Some wireless communications 100 may include network entities 105 which support power savings, for example in 5G wireless communications and massive MIMO systems (e.g., green networks). In some examples, a network entity 105 may support different sleep modes (e.g., light sleep mode, deep sleep mode) and operations to save power and maintain network operations. For example, the network entity 105 may turn off or reduce some capabilities or components while in a particular sleep mode to save power. As such, the network entity 105 may enter a different sleep mode depending on what capabilities the network entity 105 turns off. In some cases, the network entity 105 may enter a sleep mode such as a micro-sleep mode, a light sleep mode, a deep sleep mode, or a full sleep mode, where the closer a particular sleep mode is to the full sleep mode, the lower the power consumption of the network entity 105.

In some examples, sleep modes may differ in terms of operation. For example, in some sleep modes, the network entity 105 may turn off radio frequency chains. Further, different sleep modes may result in different power consumption and different transition times for the network entity 105 to transition from a particular power consumption (e.g., in a legacy operation) to a particular sleep mode. For example, in a light sleep mode, the network entity 105 may turn off some antennas and other features at an RU 170 of the network entity 105 such that the consumption power of the network entity 105 may transition into and out of the light sleep mode over a relatively short transition time. In a deep sleep mode, the network entity 105 may turn off more capabilities at the network entity 105 as compared to a lighter sleep mode, and as such, the network entity 105 may save more power but may use a longer transition time to transition into and out of the deep sleep mode.

Whether a network entity 105 enters a relatively light sleep mode or a relatively deep sleep mode may depend on traffic corresponding to one or more UEs 115 communicating with or supported by the network entity 105. For example, if the network entity 105 is communicating with multiple UEs 115 with heavy traffic loads (traffic above a threshold traffic amount), then the network entity 105 may refrain from entering any sleep mode. In some other examples, if the network entity 105 is communicating with a few UEs 115 with light traffic loads (traffic below a threshold traffic amount), then the network entity 105 may enter a light sleep mode. If the network entity 105 does not have communications scheduled or expected with any UEs 115, then the network entity 105 may enter a deep sleep mode or a full sleep mode (e.g., the network entity 105 or one or more components of the network entity 105 may be turned off completely). As such, the network entity 105 may enter a given sleep mode based on a quantity of UEs 115 communicating with the network entity 105, or the traffic or network load corresponding to the UEs 115 (e.g., the UEs 115 may have higher traffic loads in the middle of the day than at midnight), among other factors.

In some examples, the network entity 105 may be unaware of the traffic conditions of devices supported by the network entity 105 (e.g., the UEs 115), which may result in increased power consumption or failed transmissions as the network entity 105 may enter a given sleep mode inefficiently (the network entity 105 may enter a light sleep mode where a deep sleep mode may save more power, the network entity 105 may enter a sleep mode at a given time, which may be later than a time the network entity 105 may enter the sleep mode if the network entity 105 had information related to traffic conditions at one or more UEs 115, etc.). For example, the network entity 105 may save more power in a deep sleep mode than a light sleep mode, however the network entity 105 may use a longer transition time to enter the deep sleep mode during which the network entity 105 may be unable to perform communications (or other functions) with one or more UEs 115. In addition, if the network entity 105 enters the deep sleep mode without knowledge of the traffic loads of multiple UEs 115, the network entity 105 may miss or lose transmissions from the UEs 115. In some cases, if the network entity 105 enters a light sleep mode with relatively light traffic conditions, the network entity 105 may forego additional power savings had the network entity 105 entered a deep sleep mode. As such, knowing the traffic conditions of the UEs 115 in communication with the network entity 105 may assist the network entity 105 in determining to enter deeper sleep modes for increased power savings.

The wireless communications system 100 supports techniques for a UE 115 to transmit, to a network entity 105, information about expected traffic for transmission by the UE 115, which may assist the network entity 105 in determining whether to enter a sleep mode, which sleep mode to enter, which components of the network entity 105 are to enter sleep mode, etc. In some examples, the UE 115 may transmit one or more messages to the network entity 105 indicating a duration of time before expected traffic may be available for transmission at the UE 115 and an expected size (e.g., quantity of bits) associated with the expected traffic. The one or more messages may include a UAI message or a BSR message. For example, the UE 115 may receive a control message indicating a configuration for a field of a BSR associated with the expected traffic and indicating the duration of time, the size of the associated traffic, or both. In some examples, the UE 115 may receive a response message from the network entity 105 indicating that the network entity 105 is to enter a sleep mode during a time period based on the duration of time and the size of the associated traffic. For example, if the duration of time before the expected traffic is available for transmission at the UE 115 is above a threshold time, the UE 115 may receive a response message indicating that the network entity 105 is to enter a given sleep mode, and the network entity 105 may enter the sleep mode accordingly.

Figure 2:
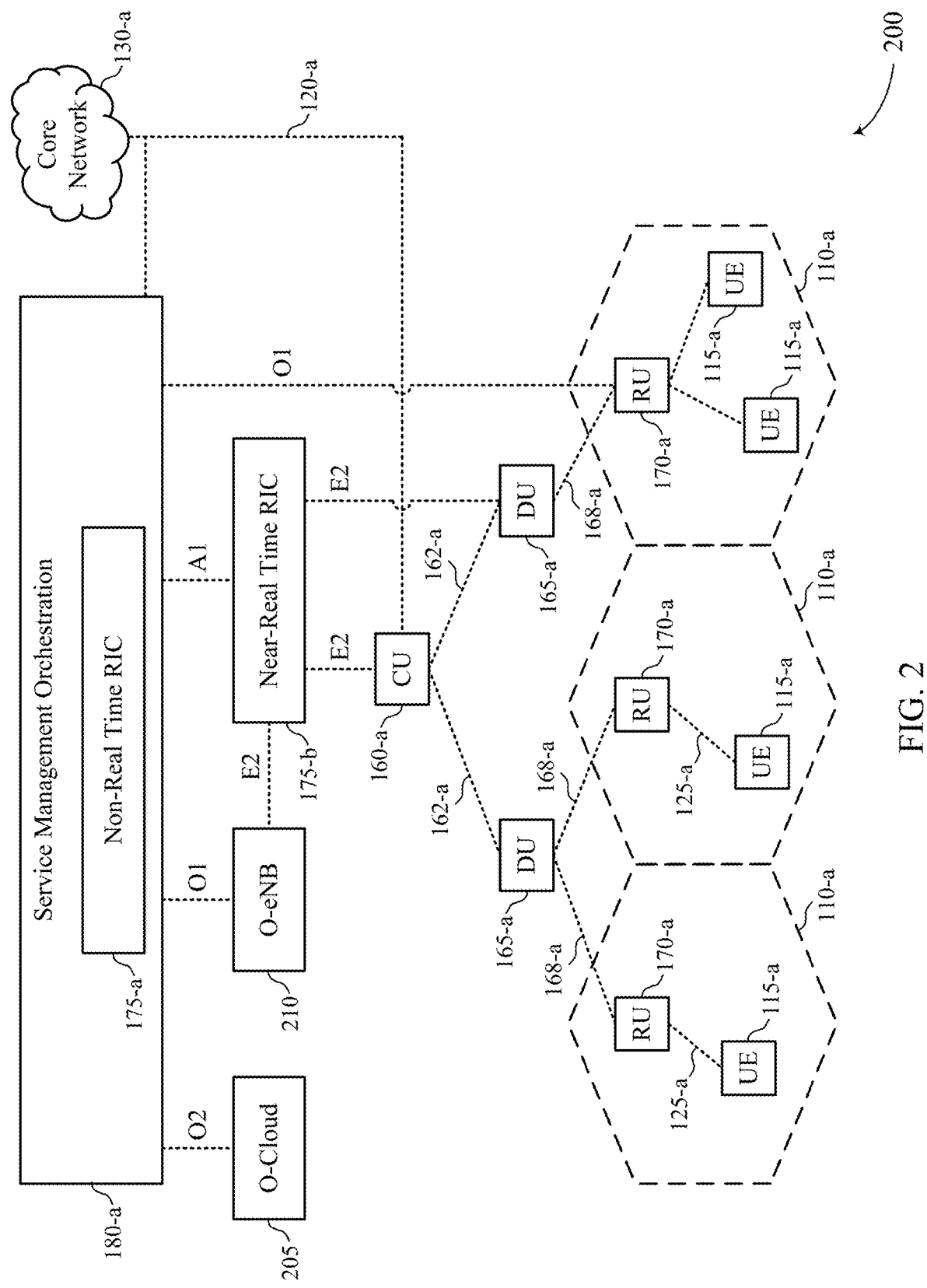
FIG. 2 illustrates an example of a wireless communications system that supports UAI and BSR extension for green networks in accordance with one or more aspects of the present disclosure.

FIG. 2 illustrates an example of a network architecture 200 (e.g., a disaggregated base station architecture, a disaggregated RAN architecture) that supports UAI and BSR extension for green networks in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may communicate with respective UEs 115-*a* via one or more communication links 125-*a*. In some implementations, a UE 115-*a* may be simultaneously served by multiple RUs 170-*a*. In some examples, a network entity 105 may support a coverage area 110-*a* (e.g., a geographic coverage area) over which the UEs 115 and RUs 170-*a* may establish one or more communication links 125-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

The network architecture 200 supports techniques for a UE 115-*a* to transmit a message to a network entity 105, the message including information about expected traffic (e.g., upcoming transmissions) by the UE 115-*a*. Such information may assist the network entity 105 in determining whether one or more components of the network entity 105 are to enter a sleep mode, what sleep mode to enter, etc. In some examples, the UE 115-*a* may transmit a UAI message or a BSR message to the network entity 105 (e.g., to the RU 170-*a* of the network entity 105) indicating a first time period that includes a duration prior to expected traffic being available for transmission at the UE 115-*a*, and indicating a size associated with the expected traffic. The UE 115-*a* may receive a control message (e.g., RRC signaling) indicating a configuration for a field of a BSR associated with the expected traffic. The field may be configured at the CU 160-*a* (or DU 165-*a*) of the network entity 105, and the control message may be transmitted (e.g., OTA) by the RU 170-*a* of the network entity 105. The configuration may indicate that the information about the expected traffic may be indicated (e.g., in a header or field) in the BSR message. Based on the configuration, a UE 115-*a* may transmit a BSR or UAI message indicating a time period for expected traffic at the UE 115-*a* and a size associated with the expected traffic. After receiving the BSR or UAI message from the UE 115-*a* (e.g., the BSR or UAI message may be received OTA by the RU 170-*a* of the network entity 105), the network entity 105 may select a sleep mode (e.g., deep sleep, light sleep, full sleep) for one or more components associated with the network entity 105 (RU 170-*a*, DU 165-*a*, etc.) and determine to enter (e.g., activate) a sleep mode based on the time period and the size associated with the expected traffic. In some cases, the network entity 105 (e.g., the RU 170-*a*) may transmit a response message to the UE 115-*a* indicating that the network entity 105 is to enter the sleep mode for one or more components, and the network entity 105 may enter (e.g., activate) the sleep mode for the one or more components. In some examples, one or multiple components of the network entity 105 (e.g., the CU 160-*a*, the DU 165-*a*, the RU 170-*a*) may enter a sleep mode based on which sleep mode the network entity 105 determines to enter. For instance, the network entity 105 may determine to enter a light sleep mode, and in doing so, may reduce power consumption by turning off particular antennas (e.g., turning off at least some capabilities of the RU 170-*a*) and performing fewer OTA communications with the UE 115-*a*.

Figure 3:
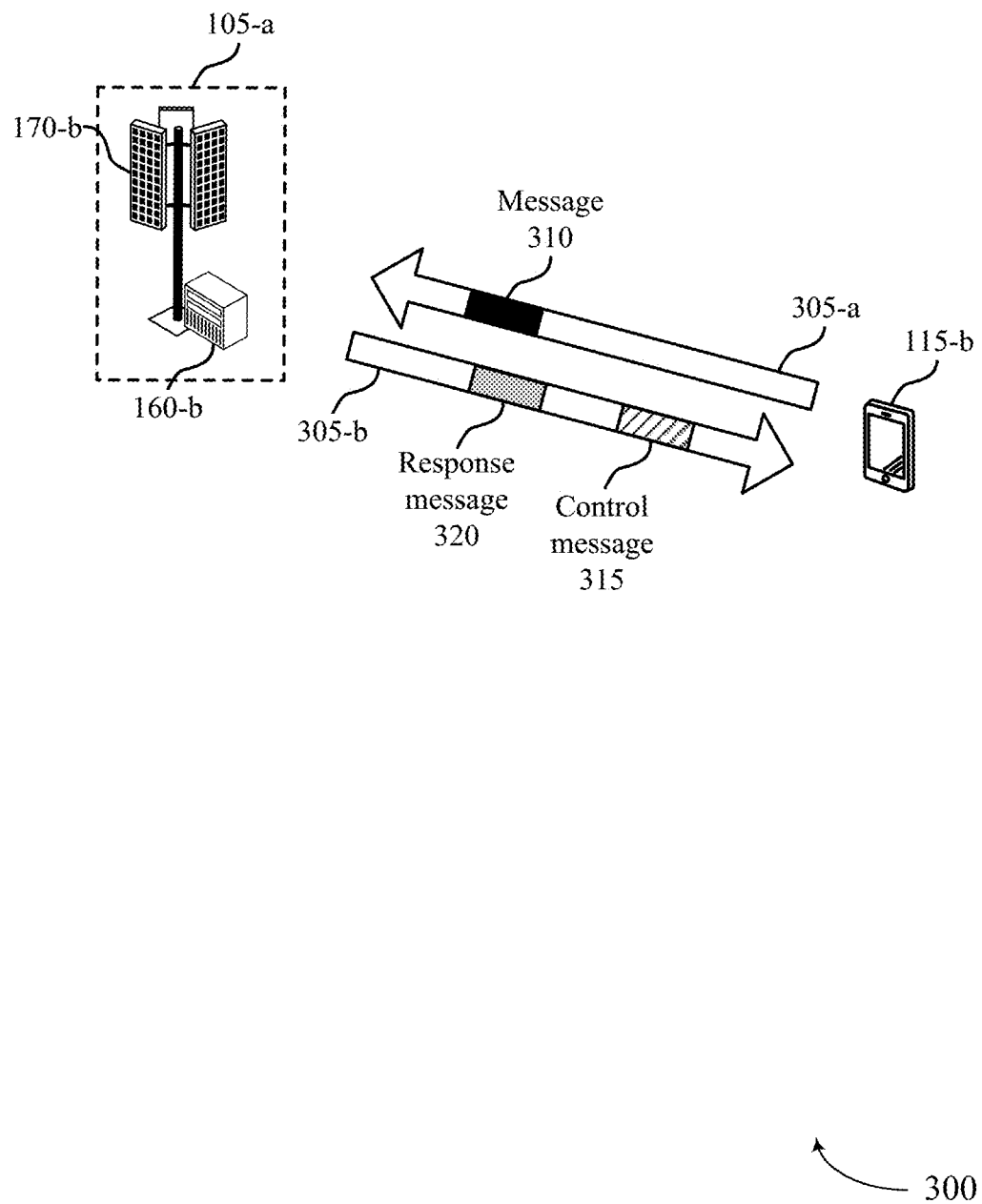
FIG. 3 illustrates an example of a wireless communications system that supports UAI and BSR extension for green networks in accordance with one or more aspects of the present disclosure.

FIG. 3 illustrates an example of a wireless communications system 300 that supports UAI and BSR extension for green networks in accordance with one or more aspects of the present disclosure. In some examples, the wireless communications system 300 may implement aspects of the wireless communications system 100 or may be implemented by aspects of the wireless communications system 100. For example, the wireless communications system 300 may include a UE 115-*b* and a network entity 105-*a*, which may be examples of corresponding devices described herein. The network entity 105-*a* may include a CU 160-*b* and an RU 170-*b* in a disaggregated RAN architecture, where the CU 160-*b* and the RU 170-*b* may be components co-located or located in distributed locations (e.g., separate physical locations).

In some examples, the UE 115-*b* may communicate with the network entity 105-*a* via a communications link 305-*a* (e.g., an uplink) and a communications link 305-*b* (e.g., a downlink). For example, the UE 115-*b* may communicate with the RU 170-*b* of the network entity 105-*a* via the communications link 305-*a* and the communications link 305-*b*. In addition, the network entity 105-*a* may communicate with multiple UEs 115 including the UE 115-*b*. In some examples, the network entity 105-*a* may be aware of current traffic conditions corresponding to the UE 115-*b*. That is, the network entity 105-*a* may know the traffic conditions at a given time, and may be communicating with the UE 115-*b* accordingly (e.g., the network entity 105-*a* may refrain from entering a sleep mode based on traffic conditions associated with the UE 115-*b*). In some examples, the network entity 105-*a* may be aware of the current traffic conditions based on a receiving a BSR (e.g., traffic conditions may be indicated via MAC-CE of the BSR) transmitted by the UE 115-*b*, which may indicate how many bits (or how much data per unit time) may be available for the UE 115-*b* for transmission. In addition, the UE 115-*b* may have additional information regarding future, expected traffic (e.g., from higher layers). As such, in addition to transmitting a BSR to the network entity 105-*a*, the UE 115-*b* may transmit a message 310 to the network entity 105-*a* indicating the additional information about the expected traffic to assist the network entity 105-*a* in determining to enter a particular sleep mode for one or more components of the network entity 105-*a*.

The wireless communications system 300 may support the UE 115-*b* indicating additional information about the expected traffic to the network entity 105-*a* to assist the network entity 105-*a* in determining to enter a particular sleep mode. In some examples, the UE 115-*b* may transmit one or more messages 310 to the network entity 105-*a*. For example, the UE 115-*b* may transmit the one or more messages 310 to the RU 170-*b* of the network entity 105-*a*. A message 310 may indicate a first time period that includes a duration prior to expected traffic being available for transmission at the UE 115-*b*. That is, the message 310 may indicate a duration of time that may occur before the UE 115-*b* has any data to transmit to the network entity 105-*a*. In addition, the message 310 may indicate a size associated with the expected traffic (e.g., a quantity of bits in the expected traffic). In some examples, the message 310 may include a UAI message that may indicate an expected time until data may be available at the MAC layer of the UE 115-*b* for uplink transmission (e.g., the first time period), an expected number of bits to arrive at the MAC layer of the UE 115-*b* for uplink transmission for a given time in the future (e.g., the size of the expected traffic), or both.

In some aspects, the UE 115-*b* may include one or more bits in a BSR, UAI, or other message that indicates information associated with the expected traffic, as indicated in Table 1 below:

TABLE 1

| Bit value | E(t) | E(n)/t |
|---|---|---|
| 0 | 100 ms | 5 MB/min |
| 1 | 1 s | 10 MB/min |
| 2 | 1 min | 25 MB/min |

In Table 1, the bit value represents a value included in a field of a BSR, UAI, or other message that may be transmitted by the UE 115-*b* to indicate information related to expected traffic for the UE 115-*b*. E(t) represents the expected arrival time for the expected traffic for the UE 115-*b*, and E(n)/t represents the expected amount of data per unit time for the expected traffic for the UE 115-*b*. As shown in Table 1, the bit value of 0 indicates that expected traffic is to occur at the UE 115-*b* in 100 ms, and the expected amount of the expected traffic is 5 megabytes (MB) per minute (min). The bit value of 1 indicates that expected traffic is to occur at the UE 115-*b* in 1 second (s), and the expected amount of the expected traffic is 10 MB per min. The bit value of 2 indicates that expected traffic is to occur at the UE 115-*b* in 1 min, and the expected amount of the expected traffic is 25 MB per min.

In some examples, the UE 115-*b* may use a BSR to report information regarding the expected traffic to the network entity 105-*a*, where the message 310 may include a BSR message. The UE 115-*b* may receive a control message 315 (e.g., RRC signaling) indicating a configuration for a field of a BSR associated with the expected traffic. In some cases, the field may be configured at the CU 160-*b* of the network entity 105-*a*, while the control message 315 may be transmitted by the RU 170-*b* of the network entity 105-*a*. The configuration may indicate that the information about the expected traffic may be indicated during the BSR transmission. For example, the UE 115-*b* may transmit a BSR in a MAC-CE to the network entity 105-*a* indicating current traffic conditions of the UE 115-*b*, where in addition to the BSR, the MAC-CE may include the additional information about the expected traffic. Thus, the configuration may indicate a particular bit in the MAC-CE that indicates the start of the information about the expected traffic (e.g., the field of the BSR associated with the expected traffic).

Once the network entity 105-*a* determines to enter a particular sleep mode or to refrain from entering a sleep mode, the network entity 105-*a* may transmit a response message 320 to the UE 115-*b* indicating that the network entity 105-*a* is to enter a particular sleep mode during the second time period based on the information about expected traffic (e.g., the first time period, the size of the expected traffic) received from multiple UEs 115. Additionally, or alternatively, the network entity 105-*a* may broadcast the response message 320 to all UEs 115 in the wireless communications system 300. In some examples, some operating parameters of the network entity 105-*a* may change depending on which sleep mode the network entity 105-*a* enters.

For example, the network entity 105-*a* may enter a light sleep mode, and in doing so, may reduce power consumption by turning off particular antennas (e.g., turning off at least some capabilities of the RU 170-*b*) and performing fewer transmissions with the UE 115-*a*. In some examples, some operating capabilities of the UE 115-*b* may change depending on which sleep mode the network entity 105-*a* enters and for how long. For example, the UE 115-*b* may transmit with higher power to accommodate for the loss of capabilities at the network entity 105-*a*, or the UE 115-*b* may lack the ability to transmit any communications to the network entity 105-*a* during the second time period that the network entity 105-*a* is in the sleep mode. As such, the UE 115-*b* may perform one or more power saving procedures based on receiving the response message 320 from the network entity 105-*a*.

Figure 4:
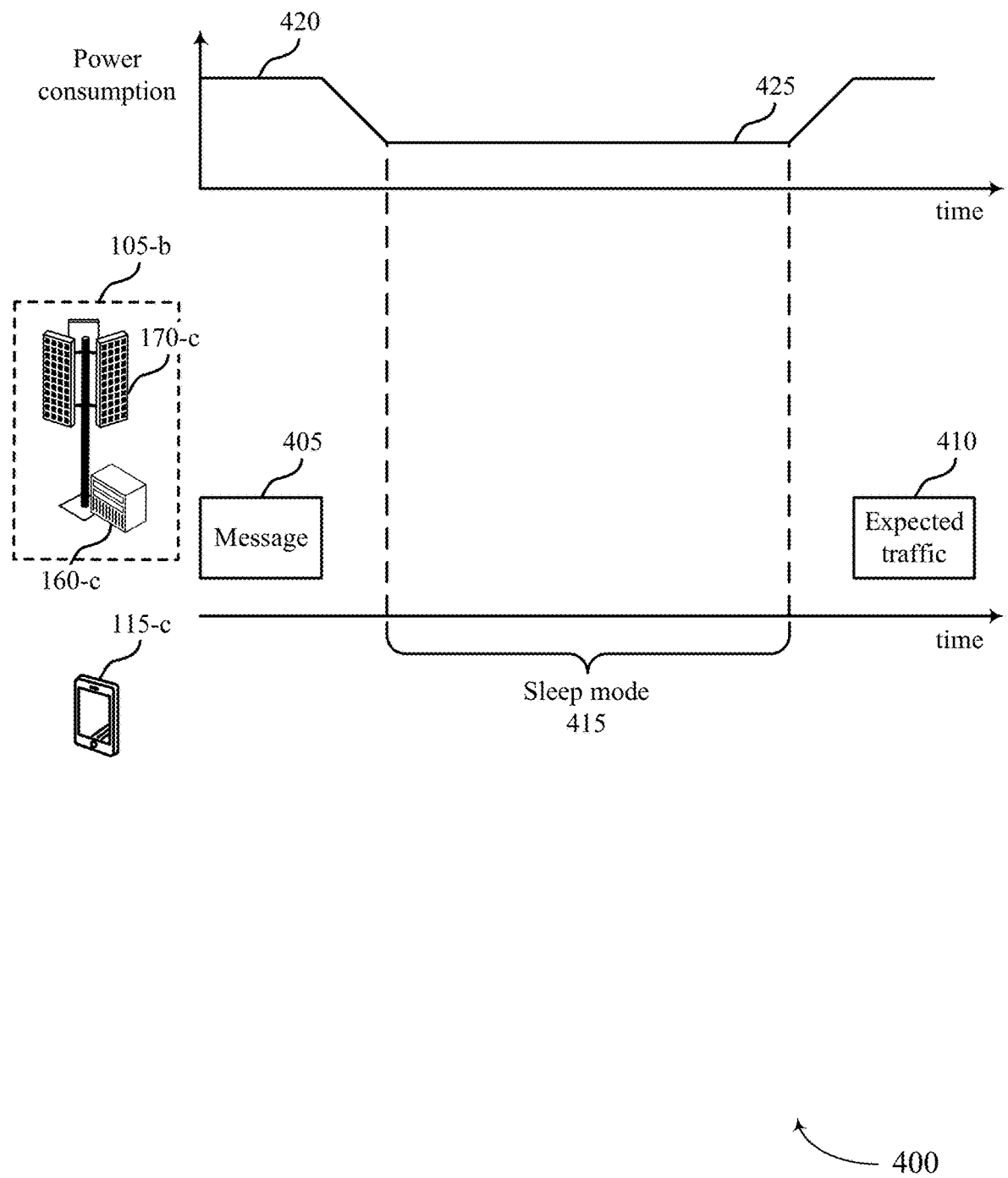
FIG. 4 illustrates an example of a timeline that supports UAI and BSR extension for green networks in accordance with one or more aspects of the present disclosure.

FIG. 4 illustrates an example of a timeline 400 that supports UAI and BSR extension for green networks in accordance with one or more aspects of the present disclosure. In some examples, the timeline 400 may implement or be implemented by aspects of the wireless communications systems 100 and 300. For example, a UE 115-*c* and a network entity 105-*b* may communicate in accordance with the timeline 400, where the network entity 105-*b* may enter one or more sleep modes based on expected traffic 410 associated with the UE 115-*c*.

As described herein, the UE 115-*c* may transmit one or more messages 405 to the network entity 105-*b*. A message 405 may indicate a first time period, which may have a duration prior to expected traffic 410 being available for transmission at the UE 115-*c* (e.g., an expected arrival time of the expected traffic 410), and a size associated with the expected traffic 410 (e.g., a quantity of bits). That is, the message 405 may indicate information about the expected traffic 410. In some examples, the network entity 105-*b* may receive messages 405 from multiple UEs 115 communicating with the network entity 105-*b*. In addition, the message 405 may include a UAI message or a BSR message, where the information about the expected traffic 410 may be indicated during a transmission of BSR.

In some examples where the message 405 includes a BSR message, the UE 115-*c* may receive a control message (e.g., RRC signaling) indicating a configuration for a field of a BSR associated with the expected traffic 410. In some cases, the field may be configured at the CU 160-*c* of the network entity 105-*b*, while the control message may be transmitted by the RU 170-*c* of the network entity 105-*b*. The configuration may indicate that the information about the expected traffic 410 may be indicated during the BSR transmission. For example, the UE 115-*c* may transmit a BSR in a MAC-CE to the network entity 105-*b* indicating current traffic conditions of the UE 115-*c*, where in addition to the BSR, the MAC-CE may include the additional information about the expected traffic 410. Thus, the configuration may indicate a particular bit in the MAC-CE that indicates the start of the information about the expected traffic 410 (e.g., the field of the BSR associated with the expected traffic 410). For example, the size of the expected traffic 410 may be two bits including one of the bit combinations 00, 01, 10, or 11. The configuration may indicate that the field of the BSR is to indicate the two bits associated with the expected traffic 410 (e.g., the size of the expected traffic 410), an expected arrival time, E(t), of the expected traffic 410 (e.g., the first time period having a duration prior to the expected traffic 410 being available for transmission at the UE 115-*c*), or both. Accordingly, the field of the BSR may include an indication of the first time period, the size associated with the expected traffic 410, or both. For example, the bit combination 00 may correspond to E(t)=2 s, the bit combination 01 may correspond to E(t)=10 s, the bit combination 10 may correspond to E(t)=1 min, and the bit combination 11 may correspond to E(t)=1 hour.

In some examples, if the first time period (e.g., E(t)) is short (e.g., a few seconds) such that the expected traffic 410 may be available for transmission at the UE 115-*c* in a relatively small amount of time, then the network entity 105-*b* may refrain from entering a sleep mode and receive a transmission of the expected traffic 410 from the UE 115-*c* according to the arrival time. As such, the network entity 105-*b* may refrain from reducing power consumption but may perform a successful transmission with the UE 115-*c*. Due to communicating with the UE 115-*c* in this way, the network entity 105-*b* may operate at a power consumption level 420, which may be a relatively nominal power consumption for the network entity 105-*b* assuming a relatively soon arrival time and particular size of the expected traffic 410.

In some cases, if the first time period is long (e.g., an hour) such that the expected traffic 410 may be available for transmission at the UE 115-*b* in a relatively long amount of time, and if the network entity 105-*b* lacks communications with other UEs 115, then the network entity 105-*b* may enter a particular sleep mode 415. That is, because the network entity 105-*b* may not expect traffic from any UE 115 in at least the next hour, then the network entity 105-*b* may turn off some capabilities and enter the sleep mode 415, thus reducing power consumption. In some examples, the UE 115-*c* may expect a hold on any activity based on user behavior. For example, a user may consistently sleep between 11:00 pm and 7:00 am, a time period which lacks any expected traffic. The network entity 105-*b* may use this information on user behavior to determine to enter the sleep mode 415 as no traffic is expected until at least 7:00 am. As such, the network entity 105-*b* may transition into the sleep mode 415 (e.g., a light sleep mode, a deep sleep mode) after receiving the message 405 and reduce its power consumption from the power consumption level 420 to a power consumption level 425, which may indicate power savings at the network entity 105-*b* based on the network entity 105-*b* turning off some functionalities (e.g., particular antennas) during the sleep mode 415.

In some examples, the network entity 105-*b* may receive additional messages from one or more additional UEs 115 indicating information about expected traffic associated with a respective UE 115. For example, the network entity 105-*b* may receive a message from a second UE 115 indicating a third time period including a duration prior to additional expected traffic being available for transmission at the second UE 115. Upon receiving the information about the additional expected traffic for multiple UEs 115, the network entity 105-*b* may determine whether to enter a particular sleep mode or to refrain from entering a sleep mode during the second time period. That is, which sleep mode the network entity 105-*b* determines to enter (e.g., a light sleep mode, a dark sleep mode), if at all, may depend on the expected traffic conditions corresponding to the multiple UEs 115 in wireless communications with the network entity 105-*b*. In some examples, the network entity 105-*b* may use a machine learning approach using a neural network, which may indicate to the network entity 105-*b* which sleep mode the network entity 105-*b* may enter, and for how long, to obtain the most power savings without sacrificing quality of communications with the UEs 115.

Once the network entity 105-*b* determines to enter a particular sleep mode or to refrain from entering a sleep mode, the network entity 105-*b* may transmit a response message to the UE 115-*c* indicating that the network entity 105-*b* is to enter the sleep mode 415 during the second time period based on the information about expected traffic 410 (e.g., the first time period, the size of the expected traffic 410) received from one or more UEs 115. In some examples, some operating capabilities of the UE 115-*c* may change depending on which sleep mode the network entity 105-*b* enters and for how long. As such, the UE 115-*c* may perform one or more power saving procedures based on receiving the response message from the network entity 105-*b*. In some examples, the network entity 105-*b* may begin to transition back out of the sleep mode 415 at some time before the expected traffic 410 is available to be transmitted at the UE 115-*c*, such that the transition time out of the sleep mode 415 occurs before the expected traffic 410. In transitioning out of the sleep mode 415, the power consumption of the network entity 105-*b* may increase (e.g., to a level similar to the power consumption level 420) such that the network entity 105-*b* may successfully perform communications with the UE 115-*c* associated with the expected traffic.

Figure 5:
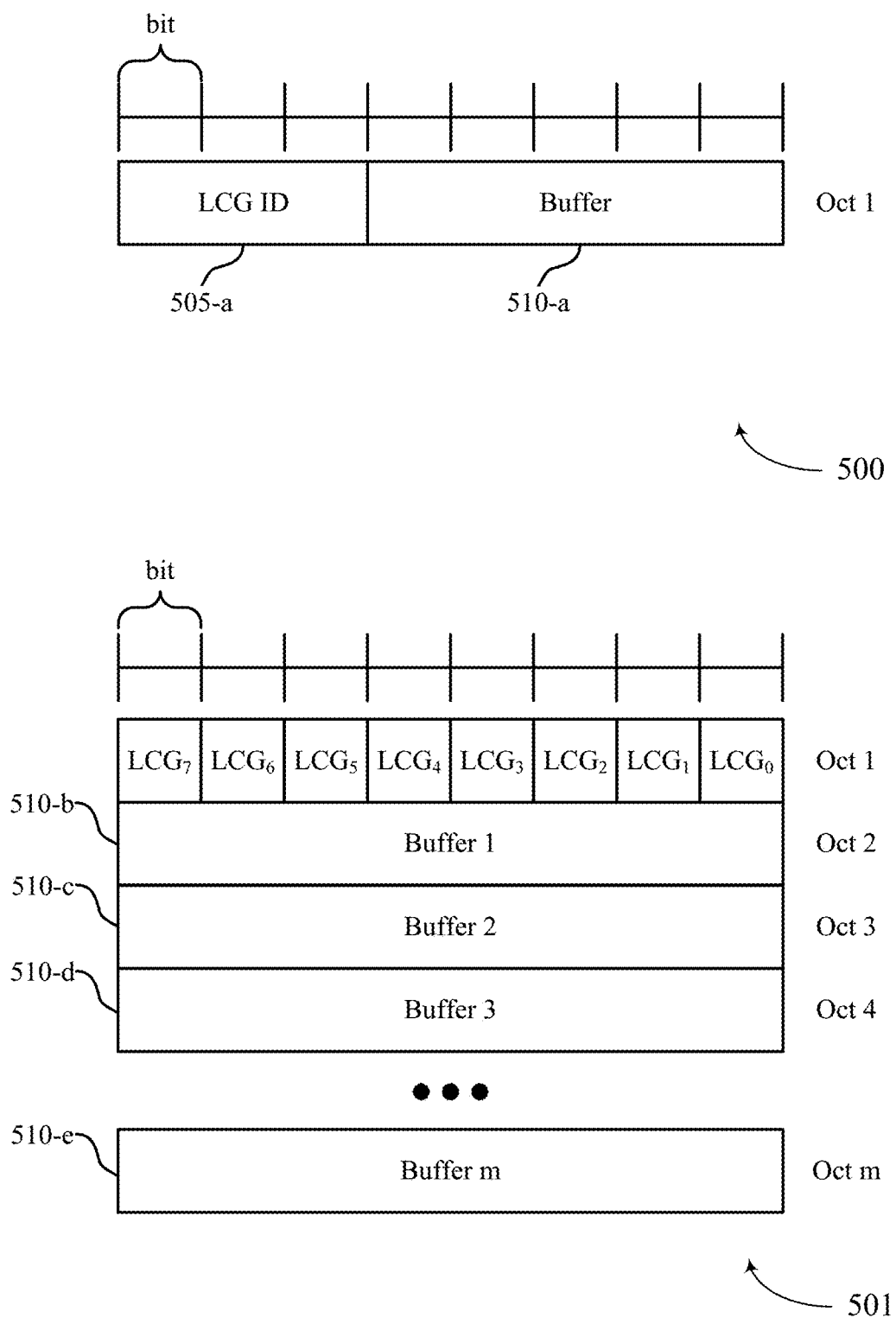
FIG. 5 illustrates examples of medium access control (MAC) control elements (CEs) that support UAI and BSR extension for green networks in accordance with one or more aspects of the present disclosure.

FIG. 5 illustrates examples of a MAC-CE 500 and a MAC-CE 501 that support UAI and BSR extension for green networks in accordance with one or more aspects of the present disclosure. In some examples, the MAC-CE 500 and the MAC-CE 501 may implement or may be implemented by aspects of the wireless communications systems 100 and 300. For example, a UE may transmit the MAC-CE 500 or the MAC-CE 501 to a network entity to indicate information about future, expected traffic, which may assist the network entity in determining to enter a particular sleep mode.

In some examples, a UE may transmit a BSR (e.g., a BSR MAC-CE) to a network entity to indicate current traffic conditions associated with the UE. For example, the UE may transmit a MAC-CE including a BSR, where the BSR may include information on how much data the UE may have to transmit to the network entity. Based on receiving the BSR, the network entity may transmit a grant to the UE such that the UE may transmit the data indicated in the BSR.

To assist the network entity in determining whether to enter a particular sleep mode, a UE may transmit one or more messages to the network entity, the one or more messages indicating a first time period having a duration prior to expected traffic being available for transmission at the UE (e.g., at some time in the future), and a size associated with the expected traffic (e.g., a quantity of bits). In some examples, the UE may detect an arrival time associated with the expected traffic, where the first time period may be based on the arrival time. In some examples, the one or more messages may include a UAI message or a BSR message. For example, the UE may receive a control message (e.g., RRC signaling) indicating a configuration for a field of a BSR associated with the expected traffic, and the UE may transmit the BSR message indicating the field of the BSR to the network entity, the field of the BSR indicating the first time period, the size of the expected traffic, or both. The UE may transmit the BSR message in the MAC-CE 500 or the MAC-CE 501 (e.g., a BSR MAC-CE).

In some examples, the MAC-CE 500 may include a short BSR format (e.g., of a fixed size), which may include a total of eight bits in one octant (e.g., Oct 1, one set of eight bits). A first set of bits (e.g., three bits) may be allocated to a logical channel group (LCG) identifier 505-*a*, which may indicate a group of logical channels for which a BSR may be included in a buffer 510-*a*, and a second set of bits (e.g., five bits) may be allocated to the BSR corresponding to a UE. As such, at least some bits of the buffer 510-*a* allocated to the BSR may indicate the current traffic conditions associated with the UE. In addition, some bits of the buffer 510-*a* allocated to the BSR may be used to indicate the information about the expected traffic, including the first time period, the size of the expected traffic, or both. That is, the UE may add the information about the expected traffic to the buffer 510-*a* during the transmission of the BSR.

In some cases, the particular bit in the MAC-CE 500 that indicates the beginning of the additional information about the expected traffic may be configured (e.g., RRC configured). For example, the UE may receive control signaling (e.g., RRC signaling) indicating a configuration for a field of a BSR associated with the expected traffic, the configuration indicating that the UE may use three bits of the buffer 510-*a* to transmit the BSR and two bits of the buffer 510-*a* to transmit the information about the expected traffic, including the first time period, the size of the expected traffic, or both.

In some examples, the MAC-CE 501 may include a long BSR format (e.g., having a variable size), which may include a total of eight bits and m octants. Each bit in the MAC-CE 501 may be allocated to a different LCG identifier. For example, a first bit may correspond to an $LCG_7$, a second bit may correspond to an $LCG_6$, a third bit may correspond to an $LCG_5$, a fourth bit may correspond to an $LCG_4$, a fifth bit may correspond to an $LCG_3$, a sixth bit may correspond to an $LCG_2$, a seventh bit may correspond to an $LCG_1$, and a seventh bit may correspond to an $LCG_0$, where the LCGs may be indicated in the first octant of bits (e.g., Oct 1). In some examples, the UE may use different octants of bits in the MAC-CE 501 to indicate at least one of a BSR and the information about the expected traffic, including the first time period having a duration prior to the expected traffic being available for transmission at the UE and the size associated with the expected traffic. For example, the UE may use a buffer 510-*b* (e.g., Buffer 1) in a second octant (e.g., Oct 2) and a buffer 510-*c* (e.g., Buffer 2) in a third octant (e.g., Oct 3) of the MAC-CE 501 to transmit BSRs, which may indicate the current traffic conditions associated with one or more UEs. In addition, the UE may a buffer 510-*d* (e.g., Buffer 3) in a fourth octant (e.g., Oct 4) of the MAC-CE 501 to indicate the first time period, the size associated with the expected traffic, or both. In some examples, the UE may use the buffer 510-*d* to indicate the first time period and a buffer 510-*e* (e.g., Buffer m) in an mth octant (e.g., Oct m) of the MAC-CE 501 to indicate the size associated with the expected traffic. In some examples, whether each octant is used to indicate a BSR or the information about the expected traffic may be configured for the UE (e.g., RRC configured).

In some cases, BSR extension values may be used to indicate an expected arrival time of expected traffic (e.g., an expected time until a next available uplink data transmission, $E(t)$), an expected arrival data rate associated with the expected traffic (e.g., a quantity of bits expected in a given time, $E(n)/t$), or both. The UE may receive a control message indicating one or more parameters associated with the expected traffic, which may include a BSR extension value, a corresponding expected arrival time, an expected arrival data rate, or any combination thereof. For example, a BSR extension value of 0 may correspond to $E(t)=100$ ms and $E(n)/t=5$ Mbytes/m, a BSR extension value of 1 may correspond to $E(t)=1$ s and $E(n)/t=10$ Mbytes/m, and a BSR extension value of 2 may correspond to $E(t)=1$ min and $E(n)/t=25$ Mbytes/m, and so on. Accordingly, a given BSR extension value may correspond to particular expected traffic being available for transmission at the UE after the first time period and having a particular size (e.g., quantity of bits).

As described herein with reference to FIG. 5, the BSR extension value, the expected arrival time, the expected arrival data rate, or any combination thereof may be included in the MAC-CE 500 or the MAC-CE 501 for some expected traffic (e.g., the information about the expected traffic may be jointly indicated with a BSR in the MAC-CE 500 or the MAC-CE 501). For example, one or multiple octants in the MAC-CE 501 may be used to indicate one or more of the BSR extension value, the expected arrival time, and the expected arrival data rate. In some examples, the BSR extension value, the expected arrival time, or the expected arrival data rate may be pre-configured (e.g., at a CU of the network entity) and indicated in an additional bit independently from a BSR. The bit may convey each metric (e.g., the BSR extension value, E(t), and E(n)/t)) based on the pre-configuration. The may reference a table of BSR extension values (e.g., which may be indicated in the control message) to determine which BSR extension value to use to convey the information about the expected traffic to the network entity.

Figure 6:
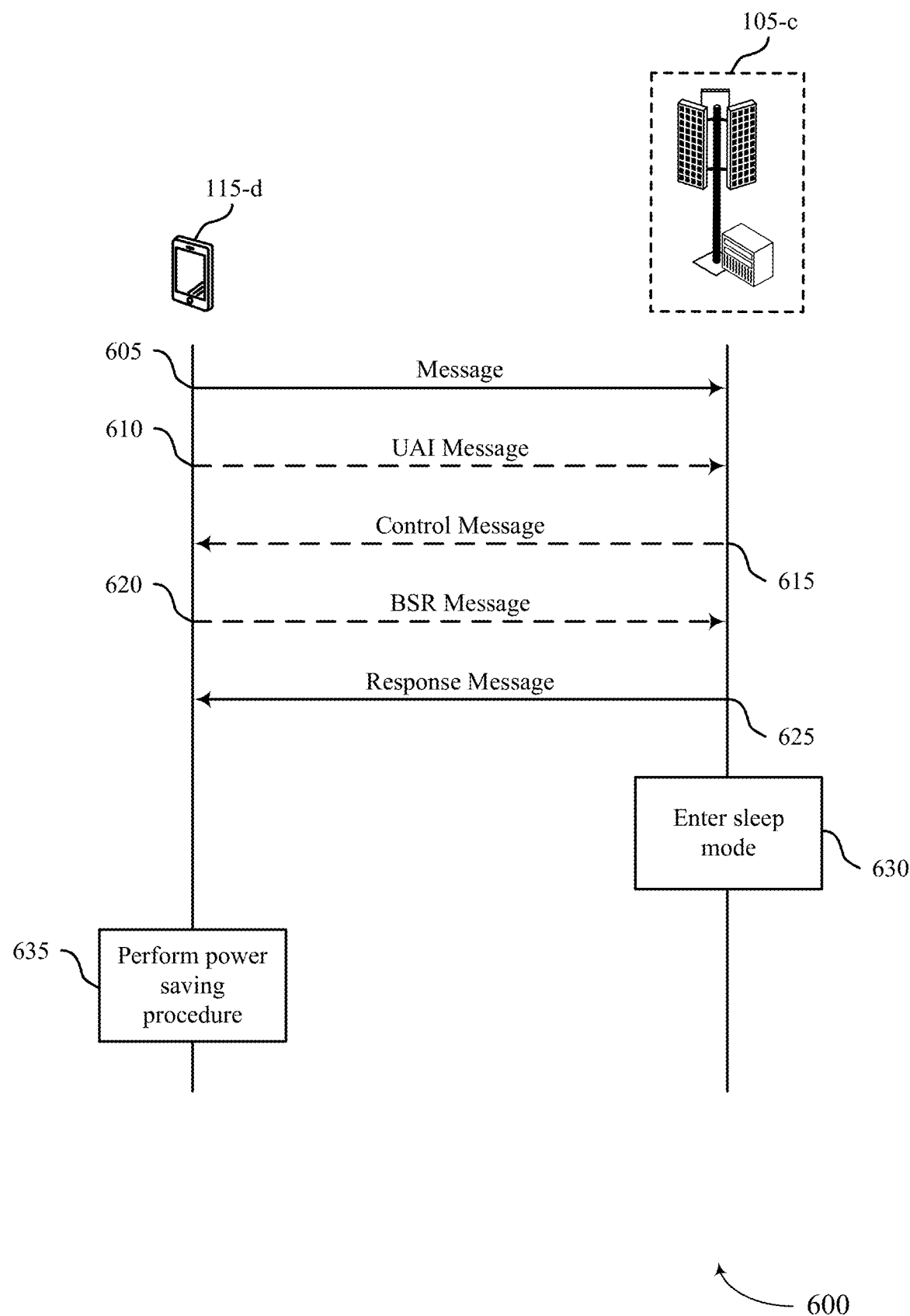
FIG. 6 illustrates an example of a process flow that UAI and BSR extension for green networks in accordance with one or more aspects of the present disclosure.

FIG. 6 illustrates an example of a process flow 600 that supports UAI and BSR extension for green networks in accordance with one or more aspects of the present disclosure. The process flow 600 may implement aspects of wireless communications systems 100 and 300, or may be implemented by aspects of the wireless communications systems 100 and 300. For example, the process flow 600 may illustrate operations between a UE 115-d and a network entity 105-c, which may be examples of corresponding devices described herein. In the following description of the process flow 600, the operations between the UE 115-d and the network entity 105-c may be transmitted in a different order than the example order shown, or the operations performed by the UE 115-d and the network entity 105-c may be performed in different orders or at different times. Some operations may also be omitted from the process flow 600, and other operations may be added to the process flow 600.

At 605, the UE 115-d may transmit one or more messages to the network entity 105-c indicating a first time period, the first time period comprising a duration prior to expected traffic being available for transmission at the UE 115-d, and the one or more messages indicating a size associated with the expected traffic. That is, the first time period may indicate a period of time before the expected traffic may arrive at the UE 115-d for transmission to the network entity 105-c. In some examples, the size associated with the expected traffic may include a quantity of bits.

At 610, the UE 115-d may transmit, to the network entity 105-c, a UAI message including an indication of the first time period, the size associated with the expected traffic, or both. For example, the UAI message may indicate an expected time until the expected traffic may be available for uplink transmission at the UE 115-d (e.g., at a MAC layer), an expected quantity of bits to arrive for uplink transmissions at the UE 115-d (e.g., at the MAC layer) for a given time in the future, or both.

At 615, the UE 115-d may receive, from the network entity 105-c, a control message indicating a configuration for a field of a BSR associated with the expected traffic. The configuration may indicate that the first time period, the size associated with the expected traffic, or both may be indicated during a transmission of a BSR (e.g., in a MAC-CE), where the BSR may indicate current traffic conditions associated with the UE 115-d. In some examples, the control message may indicate one or more parameters associated with the expected traffic and associated with a BSR extension value, which may be configured in a table.

At 620, the UE 115-d may transmit, to the network entity 105-c, a BSR message based on the configuration, where the field of the BSR may include an indication of the first time period, the size associated with the expected traffic, or both. That is, the field of the BSR (e.g., one or more bits) may be configured to indicate the first time period, the size associated with the expected traffic, or both.

At 625, the UE 115-d may receive, from the network entity 105-c, a response message based on the one or more messages, the response message indicating that the network entity 105-c is to enter a sleep mode during a second time period based on the first time period and the size associated with the expected traffic. In some examples, the network entity 105-c may broadcast the response message to multiple UEs 115 in communications with the network entity 105-c.

At 630, the network entity 105-c may enter the sleep mode based on the first time period and the size associated with the expected traffic. In some examples, the network entity 105-a may determine to enter a particular sleep mode (e.g., a light sleep mode, a deep sleep mode) for a particular amount of time based on the first time period and the size associated with the expected traffic. For example, if the first time period is relatively long, then the network entity 105-c may enter a deep sleep mode. In addition, the network entity 105-c entering a sleep mode may be based on expected traffic associated with multiple UEs 115 including the UE 115-d. By entering a sleep mode, the network entity 105-c may reduce power consumption.

At 635, the UE 115-d may perform one or more power saving procedures based on receiving the response message. For example, if the network entity 105-c enters a sleep mode and turns off antenna functionalities, the UE 115-d may refrain from communicating with the network entity 105-c.

Figure 7:
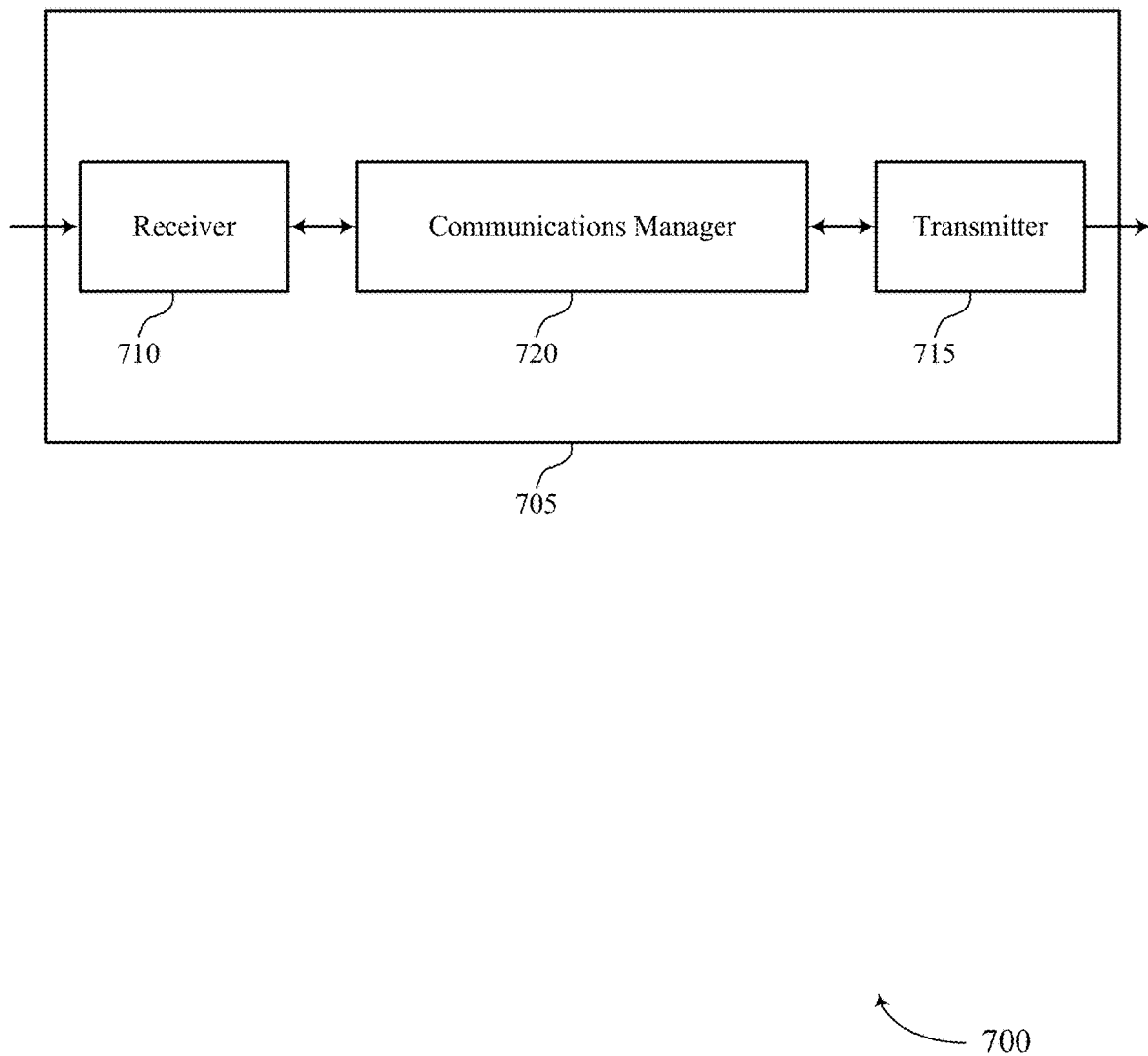
FIGS. 7 and 8 show block diagrams of devices that support UAI and BSR extension for green networks in accordance with one or more aspects of the present disclosure.

FIG. 7 shows a block diagram 700 of a device 705 that supports UAI and BSR extension for green networks in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to UAI and BSR extension for green networks). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to UAI and BSR extension for green networks). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of UAI and BSR extension for green networks as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. For example, the communications manager 720 may be configured as or otherwise support a means for transmitting one or more messages indicating a first time period, the first time period including a duration prior to expected traffic being available for transmission at the UE, the one or more messages indicating a size associated with the expected traffic. The communications manager 720 may be configured as or otherwise support a means for receiving a response message based on the one or more messages, the response message indicating that a network entity is to enter a sleep mode during a second time period based on the first time period and the size associated with the expected traffic.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for a UE performing UAI transmissions and BSR extension for green networks, which may support reduced power and resource efficiency as a network entity may enter a sleep mode during periods of low traffic loads. For example, the network entity may turn off particular components or functionalities (e.g., antennas), which may reduce the transmissions the network entity performs with the UE, thereby saving power at the network entity.

Figure 8:
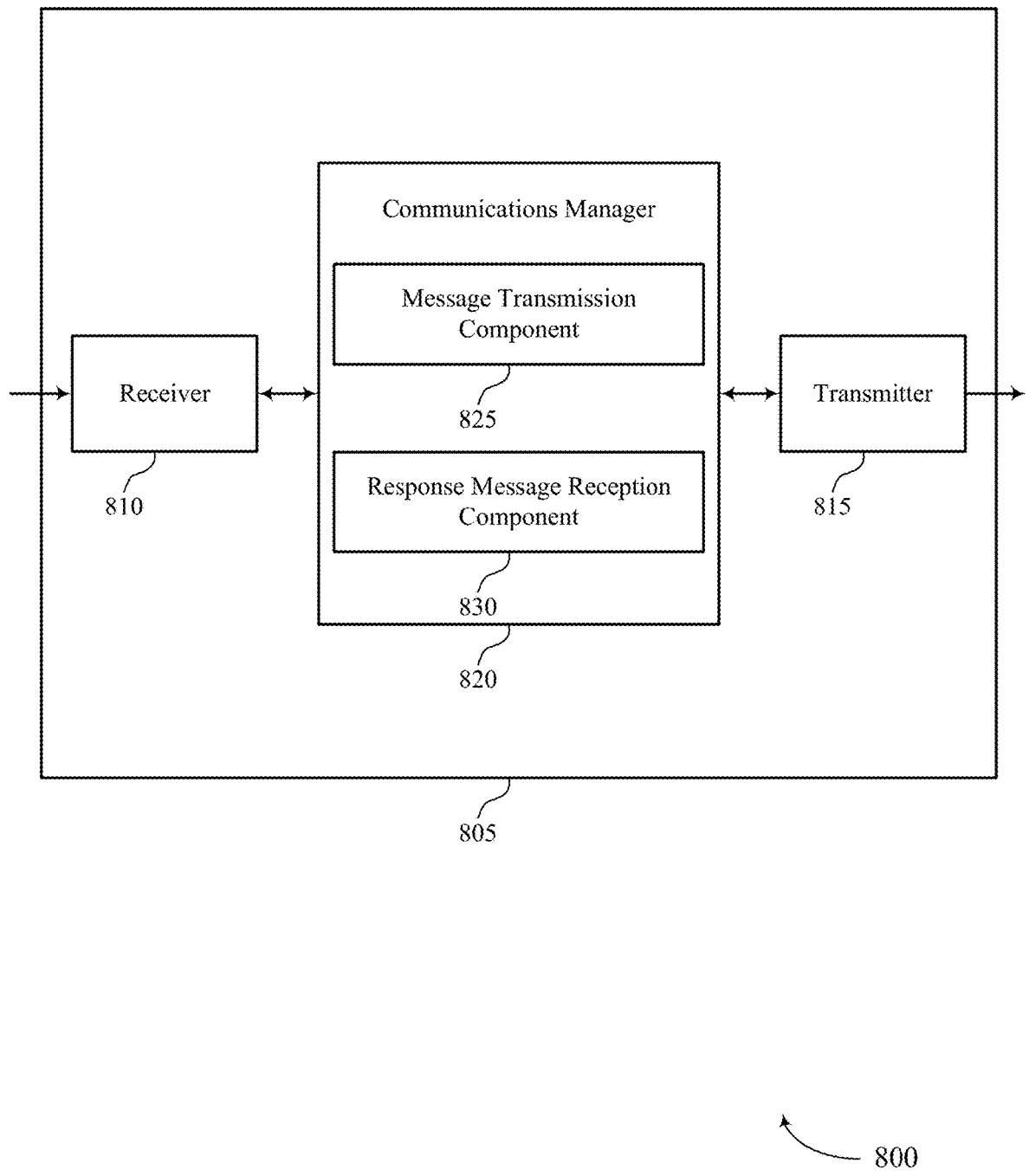

FIG. 8 shows a block diagram 800 of a device 805 that supports UAI and BSR extension for green networks in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to UAI and BSR extension for green networks). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to UAI and BSR extension for green networks). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of UAI and BSR extension for green networks as described herein. For example, the communications manager 820 may include a message transmission component 825 a response message reception component 830, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a UE in accordance with examples as disclosed herein. The message transmission component 825 may be configured as or otherwise support a means for transmitting one or more messages indicating a first time period, the first time period including a duration prior to expected traffic being available for transmission at the UE, the one or more messages indicating a size associated with the expected traffic. The response message reception component 830 may be configured as or otherwise support a means for receiving a response message based on the one or more messages, the response message indicating that a network entity is to enter a sleep mode during a second time period based on the first time period and the size associated with the expected traffic.

Figure 9:
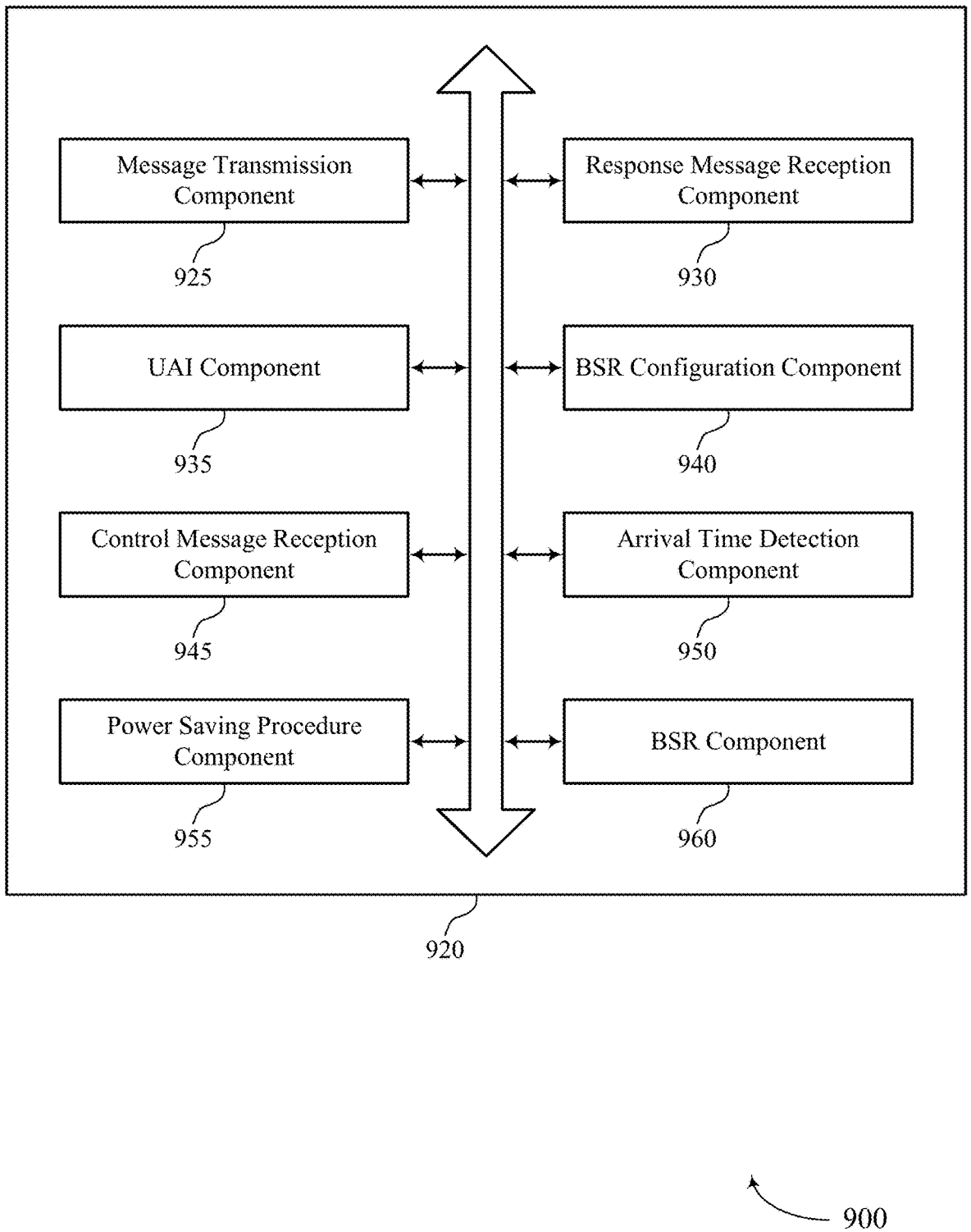
FIG. 9 shows a block diagram of a communications manager that supports UAI and BSR extension for green networks in accordance with one or more aspects of the present disclosure.

FIG. 9 shows a block diagram 900 of a communications manager 920 that supports UAI and BSR extension for green networks in accordance with one or more aspects of the present disclosure. The communications manager 920 may be an example of aspects of a communications manager 720, a communications manager 820, or both, as described herein. The communications manager 920, or various components thereof, may be an example of means for performing various aspects of UAI and BSR extension for green networks as described herein. For example, the communications manager 920 may include a message transmission component 925, a response message reception component 930, a UAI component 935, an BSR configuration component 940, a control message reception component 945, an arrival time detection component 950, a power saving procedure component 955, an BSR component 960, or any combination thereof. Each of these components may communicate, directly or indirectly, with one another (e.g., via one or more buses).

The communications manager 920 may support wireless communication at a UE in accordance with examples as disclosed herein. The message transmission component 925 may be configured as or otherwise support a means for transmitting one or more messages indicating a first time period, the first time period including a duration prior to expected traffic being available for transmission at the UE, the one or more messages indicating a size associated with the expected traffic. The response message reception component 930 may be configured as or otherwise support a means for receiving a response message based on the one or more messages, the response message indicating that a network entity is to enter a sleep mode during a second time period based on the first time period and the size associated with the expected traffic.

In some examples, to support transmitting the one or more messages, the UAI component 935 may be configured as or otherwise support a means for transmitting a UAI message including an indication of the first time period, the size associated with the expected traffic, or both.

In some examples, the BSR configuration component 940 may be configured as or otherwise support a means for receiving a control message indicating a configuration for a field of a BSR associated with the expected traffic.

In some examples, the BSR component 960 may be configured as or otherwise support a means for transmitting a BSR message based on the configuration, the field of the BSR including an indication of the first time period, the size associated with the expected traffic, or both.

In some examples, the control message reception component 945 may be configured as or otherwise support a means for receiving a control message indicating one or more parameters associated with the expected traffic, the one or more parameters including a BSR extension value, an expected time period prior to the expected traffic being available for transmission at the UE, a quantity of bits expected in the expected traffic, or any combination thereof.

In some examples, to support transmitting the one or more messages, the message transmission component 925 may be configured as or otherwise support a means for transmitting a first message that indicates both the first time period and the size associated with the expected traffic.

In some examples, to support transmitting the one or more messages, the message transmission component 925 may be configured as or otherwise support a means for transmitting a first message indicating the first time period. In some examples, to support transmitting the one or more messages, the message transmission component 925 may be configured as or otherwise support a means for transmitting a second message indicating the size associated with the expected traffic.

In some examples, the arrival time detection component 950 may be configured as or otherwise support a means for detecting an arrival time associated with the expected traffic, where the first time period is based on the arrival time. In some examples, the power saving procedure component 955 may be configured as or otherwise support a means for performing one or more power saving procedures based on receiving the response message. In some examples, the size associated with the expected traffic indicates an expected quantity of bits associated with the expected traffic.

Figure 10:
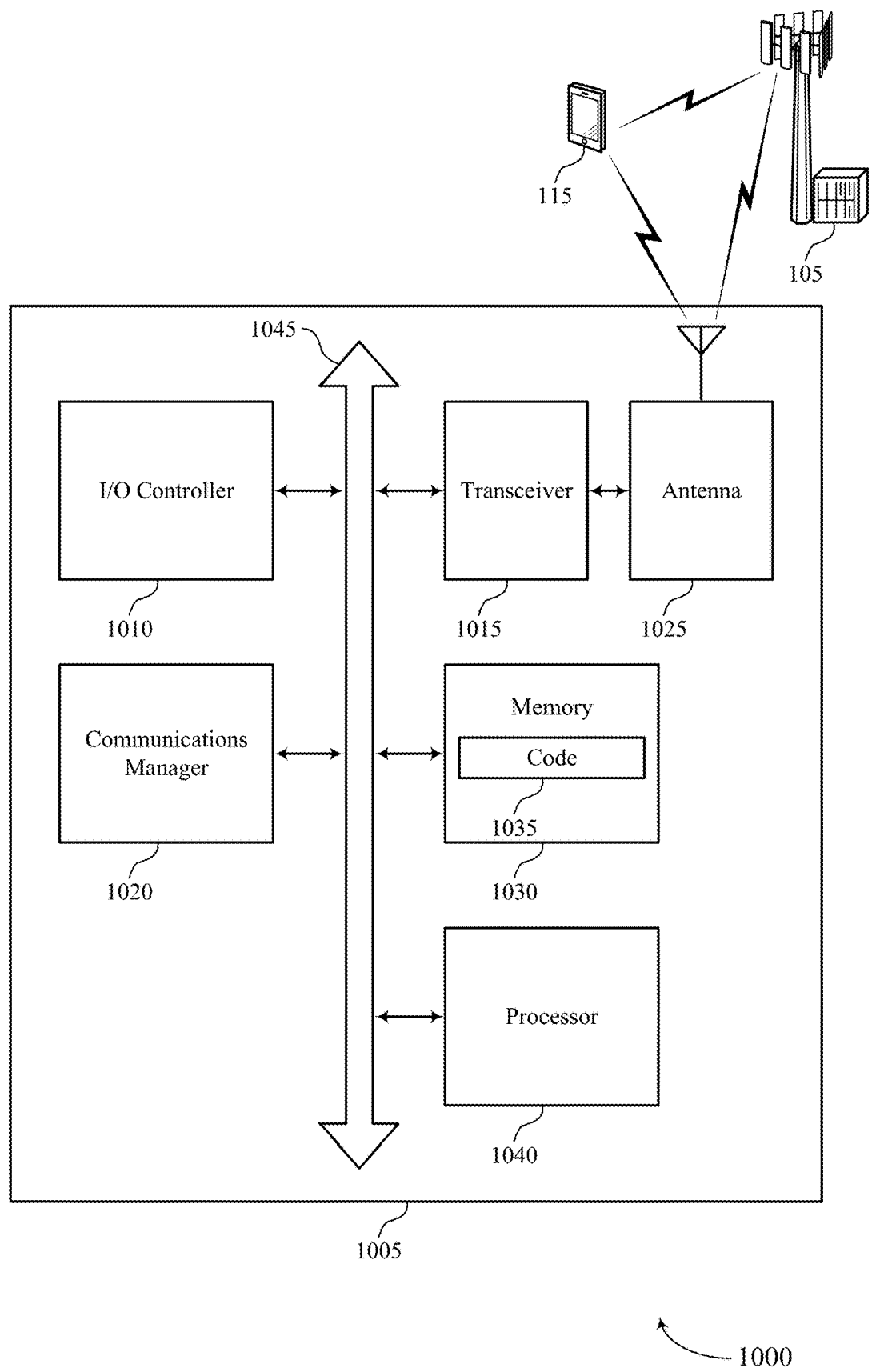
FIG. 10 shows a diagram of a system including a device that supports UAI and BSR extension for green networks in accordance with one or more aspects of the present disclosure.

FIG. 10 shows a diagram of a system 1000 including a device 1005 that supports UAI and BSR extension for green networks in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting UAI and BSR extension for green networks). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for transmitting one or more messages indicating a first time period, the first time period including a duration prior to expected traffic being available for transmission at the UE, the one or more messages indicating a size associated with the expected traffic. The communications manager 1020 may be configured as or otherwise support a means for receiving a response message based on the one or more messages, the response message indicating that a network entity is to enter a sleep mode during a second time period based on the first time period and the size associated with the expected traffic.

By including or configuring the communications manager 1020 in accordance with examples as described herein, the device 1005 may support techniques for a UE performing UAI transmissions and BSR extension for green networks, which may support reduced power and resource efficiency as a network entity may enter a sleep mode during periods of low traffic loads. For example, the network entity may turn off particular components or functionalities (e.g., antennas), which may reduce the transmissions the network entity performs with the UE, thereby saving power at the network entity.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of UAI and BSR extension for green networks as described herein, or the processor 1040 and the memory 1030 may be otherwise configured to perform or support such operations.

Figure 11:
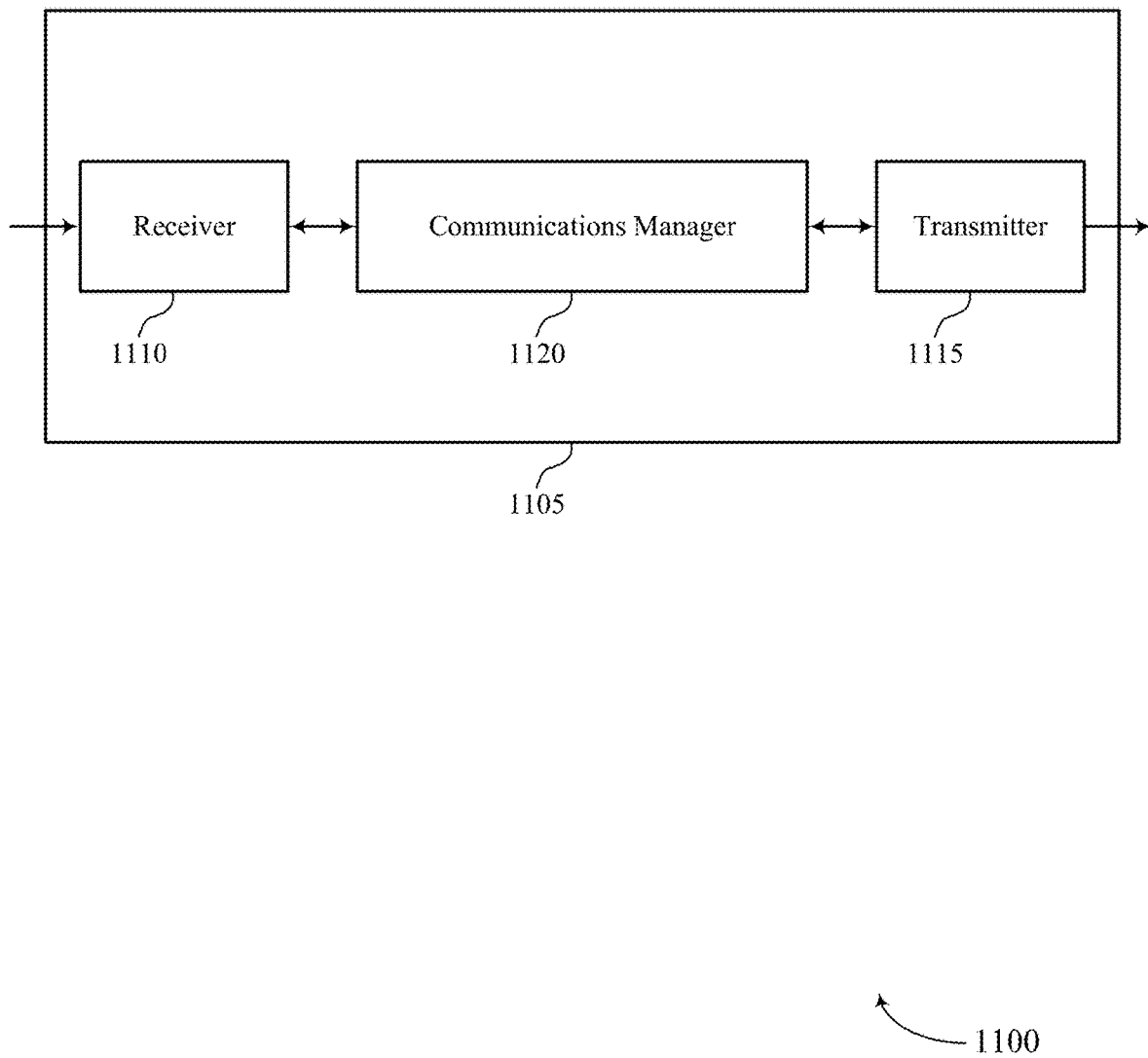
FIGS. 11 and 12 show block diagrams of devices that support UAI and BSR extension for green networks in accordance with one or more aspects of the present disclosure.

FIG. 11 shows a block diagram 1100 of a device 1105 that supports UAI and BSR extension for green networks in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of UAI and BSR extension for green networks as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. For example, the communications manager 1120 may be configured as or otherwise support a means for receiving one or more messages indicating a first time period, the first time period including a duration prior to expected traffic being available for transmission at a UE, the one or more messages indicating a size associated with the expected traffic. The communications manager 1120 may be configured as or otherwise support a means for transmitting a response message based on the one or more messages, the response message indicating that the network entity is to enter a sleep mode during a second time period based on the first time period and the size associated with the expected traffic. The communications manager 1120 may be configured as or otherwise support a means for entering the sleep mode based on the first time period and the size associated with the expected traffic.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for a UE performing UAI transmissions and BSR extension for green networks, which may support reduced power and resource efficiency as a network entity may enter a sleep mode during periods of low traffic loads. For example, the network entity may turn off particular components or functionalities (e.g., antennas), which may reduce the transmissions the network entity performs with the UE, thereby saving power at the network entity.

Figure 12:
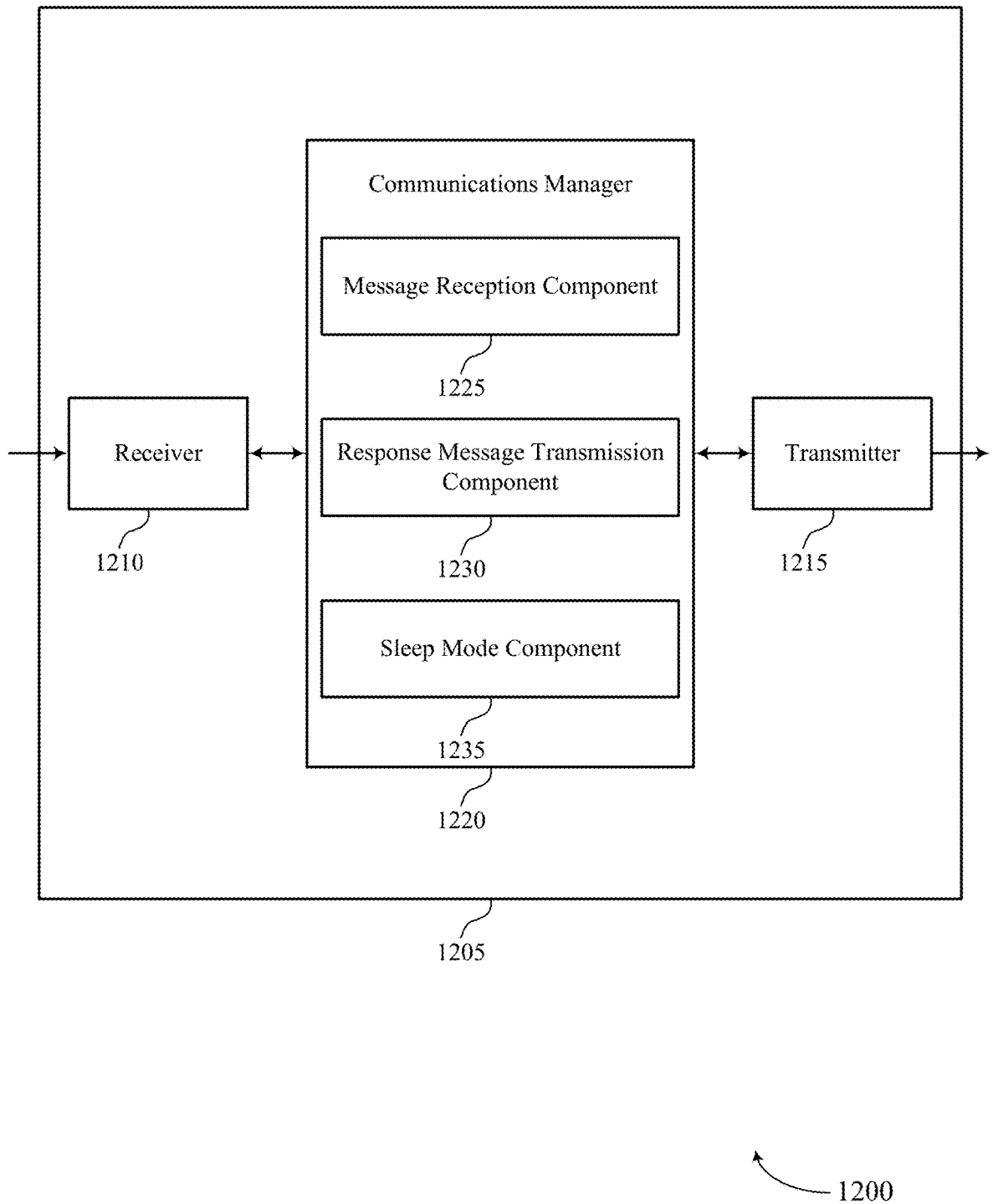

FIG. 12 shows a block diagram 1200 of a device 1205 that supports UAI and BSR extension for green networks in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of UAI and BSR extension for green networks as described herein. For example, the communications manager 1220 may include a message reception component 1225, a response message transmission component 1230, a sleep mode component 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication at a network entity in accordance with examples as disclosed herein. The message reception component 1225 may be configured as or otherwise support a means for receiving one or more messages indicating a first time period, the first time period including a duration prior to expected traffic being available for transmission at a UE, the one or more messages indicating a size associated with the expected traffic. The response message transmission component 1230 may be configured as or otherwise support a means for transmitting a response message based on the one or more messages, the response message indicating that the network entity is to enter a sleep mode during a second time period based on the first time period and the size associated with the expected traffic. The sleep mode component 1235 may be configured as or otherwise support a means for entering the sleep mode based on the first time period and the size associated with the expected traffic.

Figure 13:
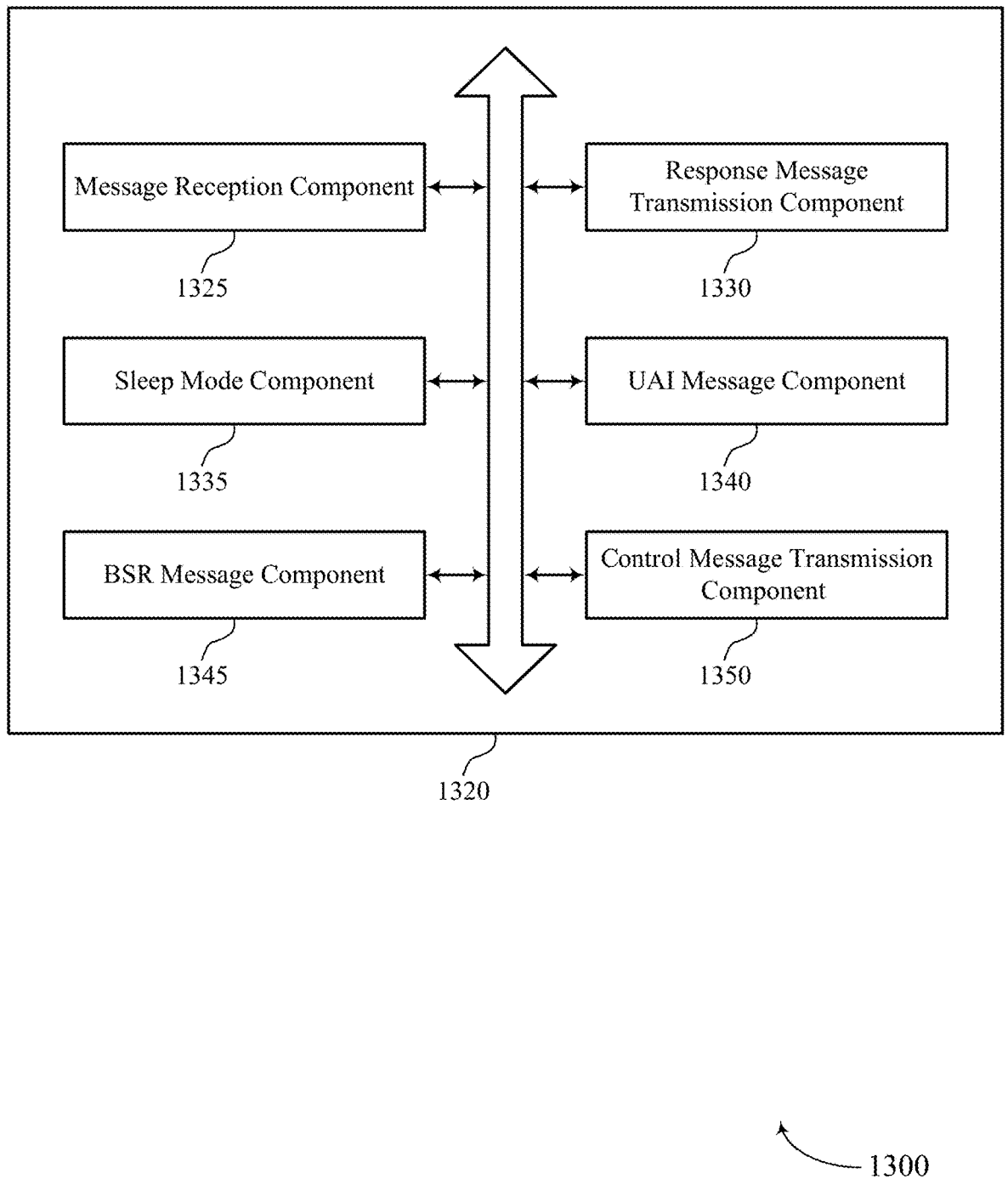
FIG. 13 shows a block diagram of a communications manager that supports UAI and BSR extension for green networks in accordance with one or more aspects of the present disclosure.

FIG. 13 shows a block diagram 1300 of a communications manager 1320 that supports UAI and BSR extension for green networks in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of UAI and BSR extension for green networks as described herein. For example, the communications manager 1320 may include a message reception component 1325, a response message transmission component 1330, a sleep mode component 1335, a UAI message component 1340, an BSR message component 1345, a control message transmission component 1350, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communication at a network entity in accordance with examples as disclosed herein. The message reception component 1325 may be configured as or otherwise support a means for receiving one or more messages indicating a first time period, the first time period including a duration prior to expected traffic being available for transmission at a UE, the one or more messages indicating a size associated with the expected traffic. The response message transmission component 1330 may be configured as or otherwise support a means for transmitting a response message based on the one or more messages, the response message indicating that the network entity is to enter a sleep mode during a second time period based on the first time period and the size associated with the expected traffic. The sleep mode component 1335 may be configured as or otherwise support a means for entering the sleep mode based on the first time period and the size associated with the expected traffic.

In some examples, the message reception component 1325 may be configured as or otherwise support a means for receiving one or more additional messages from a second UE, the one or more additional messages including an indication of a third time period prior to second expected traffic being available for transmission at the second UE.

In some examples, the sleep mode component 1335 may be configured as or otherwise support a means for determining to enter the sleep mode during the second time period based on the one or more messages and the one or more additional messages.

In some examples, to support receiving the one or more messages, the UAI message component 1340 may be configured as or otherwise support a means for receiving a UAI message including an indication of the first time period, the size associated with the expected traffic, or both.

In some examples, the BSR message component 1345 may be configured as or otherwise support a means for receiving a control message indicating a configuration for a field of a BSR associated with the expected traffic.

In some examples, the BSR message component 1345 may be configured as or otherwise support a means for receiving a BSR message based on the configuration, the field of the BSR indicating the first time period prior to the expected traffic being available for transmission at the UE, the size associated with the expected traffic, or both.

In some examples, the control message transmission component 1350 may be configured as or otherwise support a means for transmitting a control message indicating one or more parameters associated with the expected traffic, the one or more parameters including a BSR extension value, an expected time period prior to the expected traffic being available for transmission at the UE, a quantity of bits expected in the expected traffic, or any combination thereof.

In some examples, to support receiving the one or more messages, the message reception component 1325 may be configured as or otherwise support a means for receiving a first message that indicates both the first time period and the size associated with the expected traffic.

In some examples, to support receiving the one or more messages, the message reception component 1325 may be configured as or otherwise support a means for receiving a first message indicating the first time period. In some examples, to support receiving the one or more messages, the message reception component 1325 may be configured as or otherwise support a means for receiving a second message indicating the size associated with the expected traffic. In some examples, the size associated with the expected traffic indicates an expected quantity of bits associated with the expected traffic.

Figure 14:
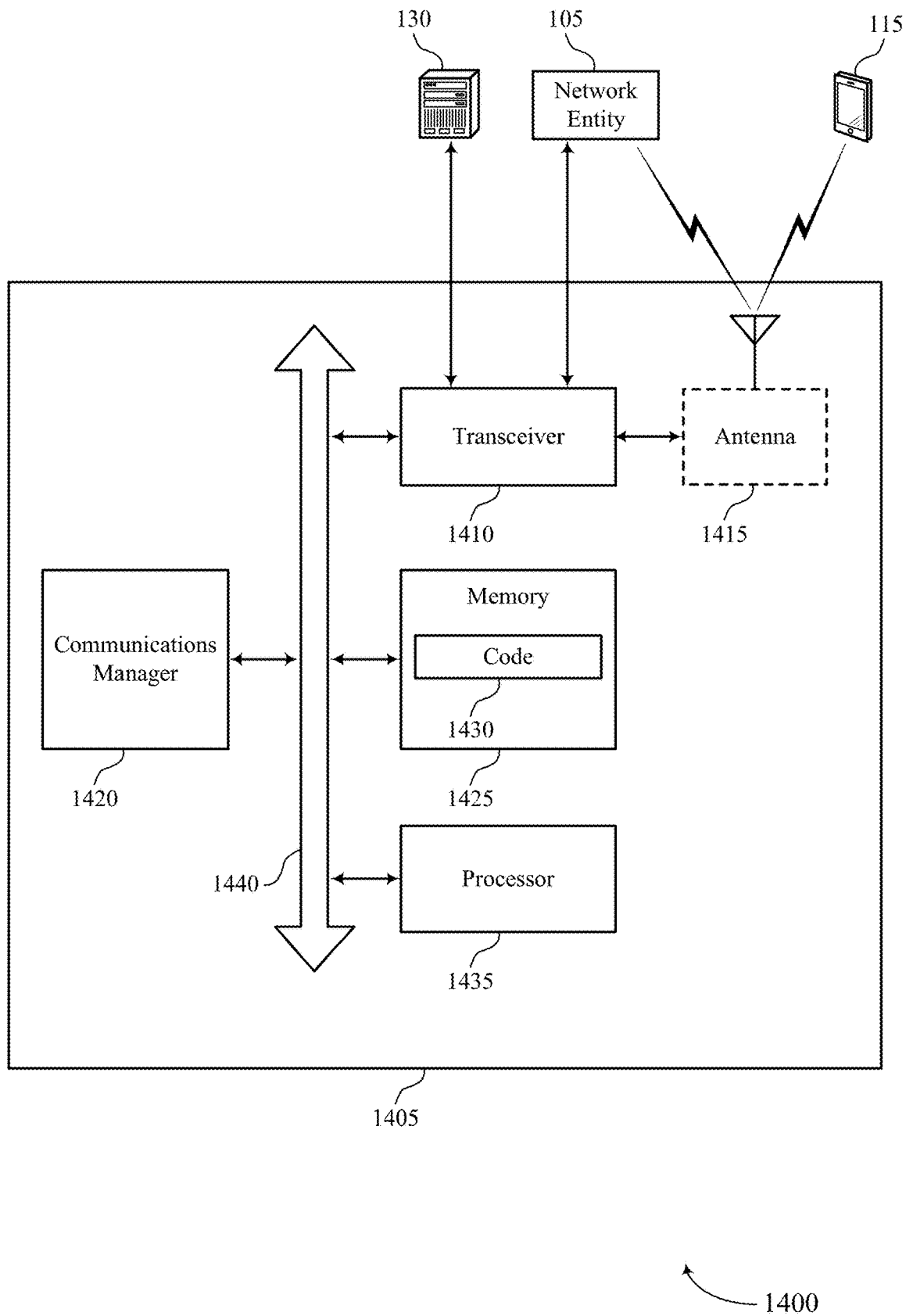
FIG. 14 shows a diagram of a system including a device that supports UAI and BSR extension for green networks in accordance with one or more aspects of the present disclosure.

FIG. 14 shows a diagram of a system 1400 including a device 1405 that supports UAI and BSR extension for green networks in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. The transceiver 1410, or the transceiver 1410 and one or more antennas 1415 or wired interfaces, where applicable, may be an example of a transmitter 1115, a transmitter 1215, a receiver 1110, a receiver 1210, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting UAI and BSR extension for green networks). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communication at a network entity in accordance with examples as disclosed herein. For example, the communications manager 1420 may be configured as or otherwise support a means for receiving one or more messages indicating a first time period, the first time period including a duration prior to expected traffic being available for transmission at a UE, the one or more messages indicating a size associated with the expected traffic. The communications manager 1420 may be configured as or otherwise support a means for transmitting a response message based on the one or more messages, the response message indicating that the network entity is to enter a sleep mode during a second time period based on the first time period and the size associated with the expected traffic. The communications manager 1420 may be configured as or otherwise support a means for entering the sleep mode based on the first time period and the size associated with the expected traffic.

By including or configuring the communications manager 1420 in accordance with examples as described herein, the device 1405 may support techniques for a UE performing UAI transmissions and BSR extension for green networks, which may support reduced power and resource efficiency as a network entity may enter a sleep mode during periods of low traffic loads. For example, the network entity may turn off particular components or functionalities (e.g., antennas), which may reduce the transmissions the network entity performs with the UE, thereby saving power at the network entity.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the processor 1435, the memory 1425, the code 1430, the transceiver 1410, or any combination thereof. For example, the code 1430 may include instructions executable by the processor 1435 to cause the device 1405 to perform various aspects of UAI and BSR extension for green networks as described herein, or the processor 1435 and the memory 1425 may be otherwise configured to perform or support such operations.

Figure 15:
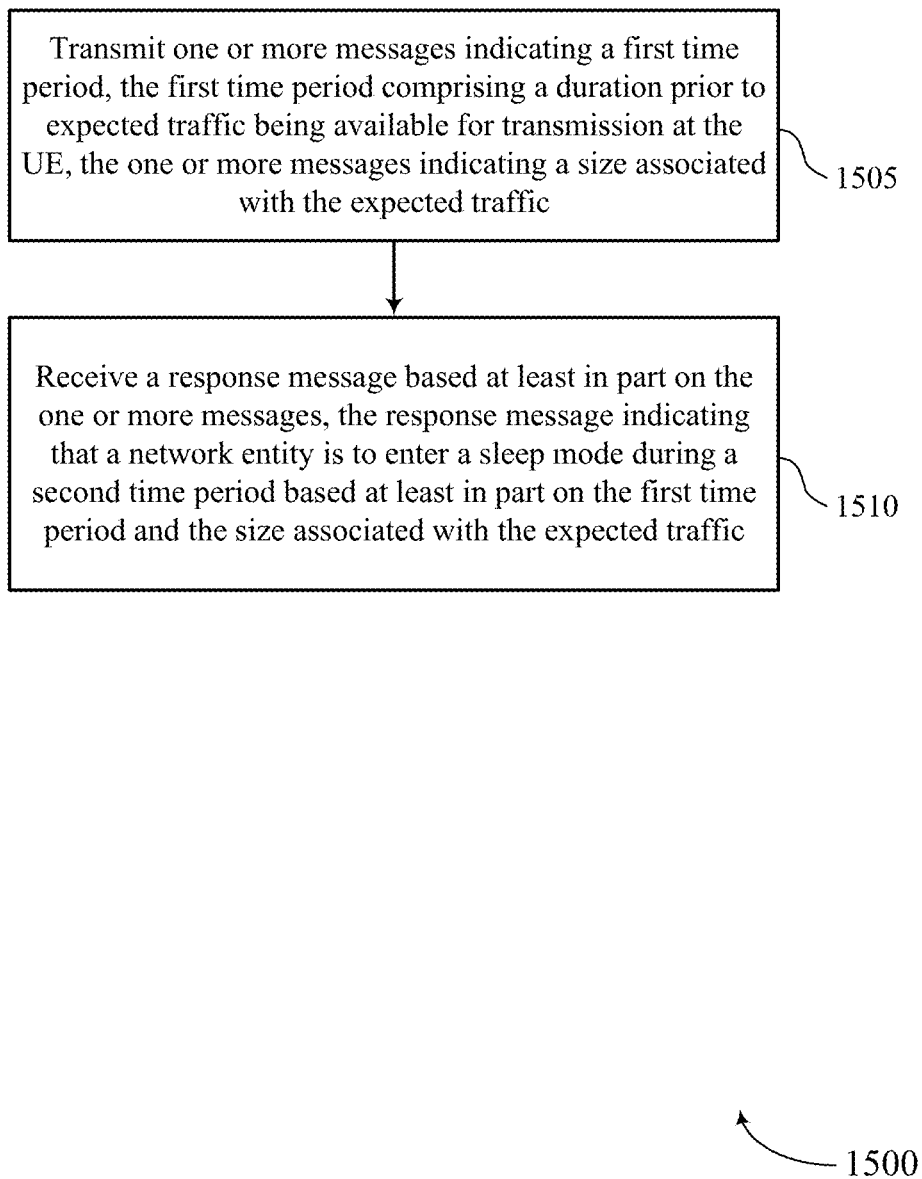
FIGS. 15 through 19 show flowcharts illustrating methods that support UAI and BSR extension for green networks in accordance with one or more aspects of the present disclosure.

FIG. 15 shows a flowchart illustrating a method 1500 that UAI and BSR extension for green networks in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include transmitting one or more messages indicating a first time period, the first time period including a duration prior to expected traffic being available for transmission at the UE, the one or more messages indicating a size associated with the expected traffic. The operations of 1505 may be performed in accordance with examples as disclosed herein. In some examples, aspects of the operations of 1505 may be performed by a message transmission component 925 as described with reference to FIG. 9.

At 1510, the method may include receiving a response message based on the one or more messages, the response message indicating that a network entity is to enter a sleep mode during a second time period based on the first time period and the size associated with the expected traffic. The operations of 1510 may be performed in accordance with examples as disclosed herein. In some examples, aspects of the operations of 1510 may be performed by a response message reception component 930 as described with reference to FIG. 9.

Figure 16:
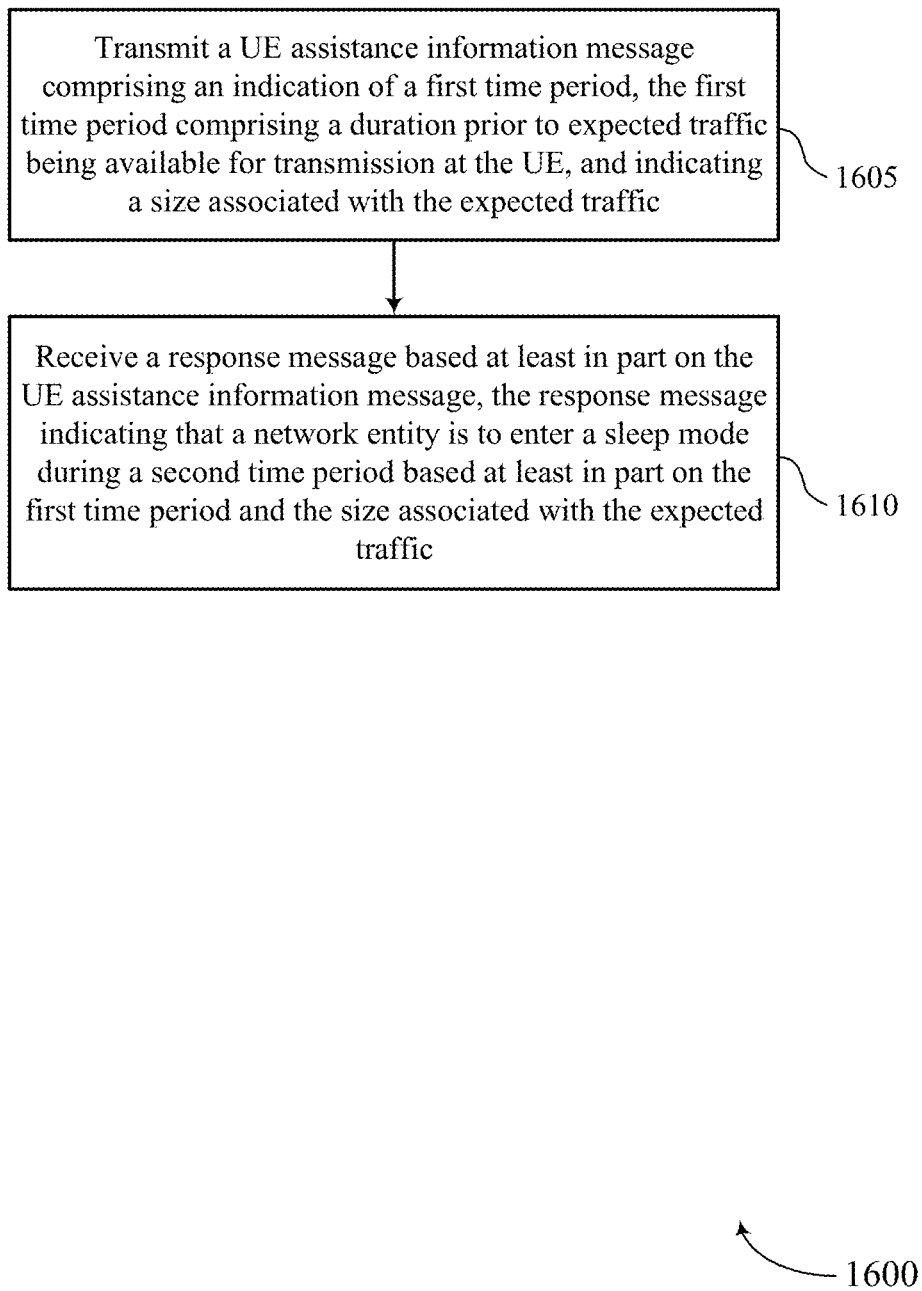

FIG. 16 shows a flowchart illustrating a method 1600 that supports UAI and BSR extension for green networks in accordance with one or more aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include transmitting a UAI message indicating a first time period, the first time period including a duration prior to expected traffic being available for transmission at the UE, and indicating a size associated with the expected traffic. The operations of 1605 may be performed in accordance with examples as disclosed herein. In some examples, aspects of the operations of 1605 may be performed by a message transmission component 925 as described with reference to FIG. 9.

At 1610, the method may include receiving a response message based on the UAI message, the response message indicating that a network entity is to enter a sleep mode during a second time period based on the first time period and the size associated with the expected traffic. The operations of 1610 may be performed in accordance with examples as disclosed herein. In some examples, aspects of the operations of 1610 may be performed by a response message reception component 930 as described with reference to FIG. 9.

Figure 17:
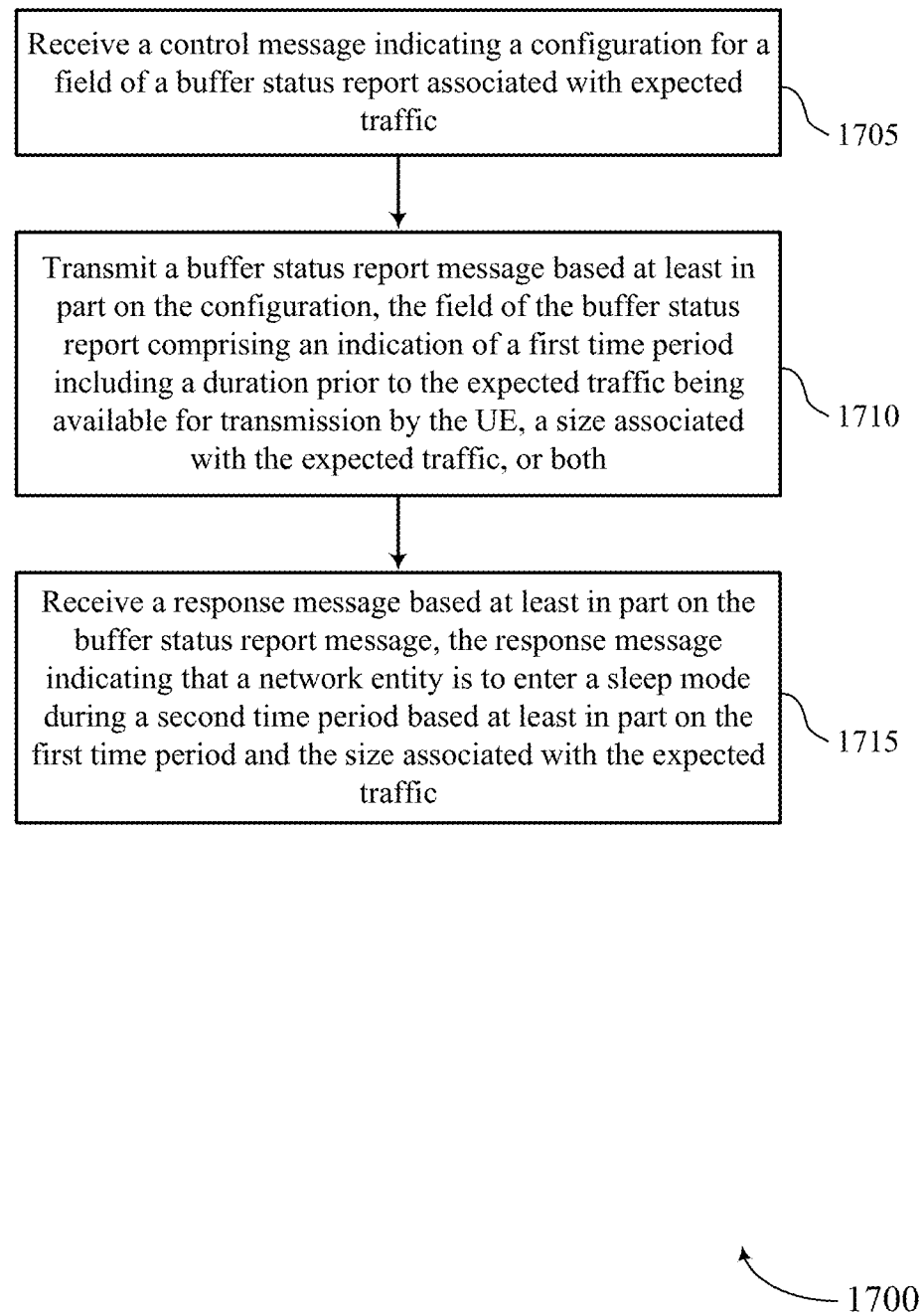

FIG. 17 shows a flowchart illustrating a method 1700 that supports UAI and BSR extension for green networks in accordance with one or more aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1705, the method may include receiving a control message indicating a configuration for a field of a BSR associated with expected traffic. The operations of 1705 may be performed in accordance with examples as disclosed herein. In some examples, aspects of the operations of 1705 may be performed by an BSR configuration component 940 as described with reference to FIG. 9.

At 1710, the method may include transmitting a BSR message based on the configuration, the field of the BSR including an indication of a first time period including a duration prior to the expected traffic being available for transmission by the UE, a size associated with the expected traffic, or both. The operations of 1710 may be performed in accordance with examples as disclosed herein. In some examples, aspects of the operations of 1710 may be performed by an BSR component 960 as described with reference to FIG. 9.

At 1715, the method may include receiving a response message based on the BSR message, the response message indicating that a network entity is to enter a sleep mode during a second time period based on the first time period and the size associated with the expected traffic. The operations of 1715 may be performed in accordance with examples as disclosed herein. In some examples, aspects of the operations of 1715 may be performed by a response message reception component 930 as described with reference to FIG. 9.

Figure 18:
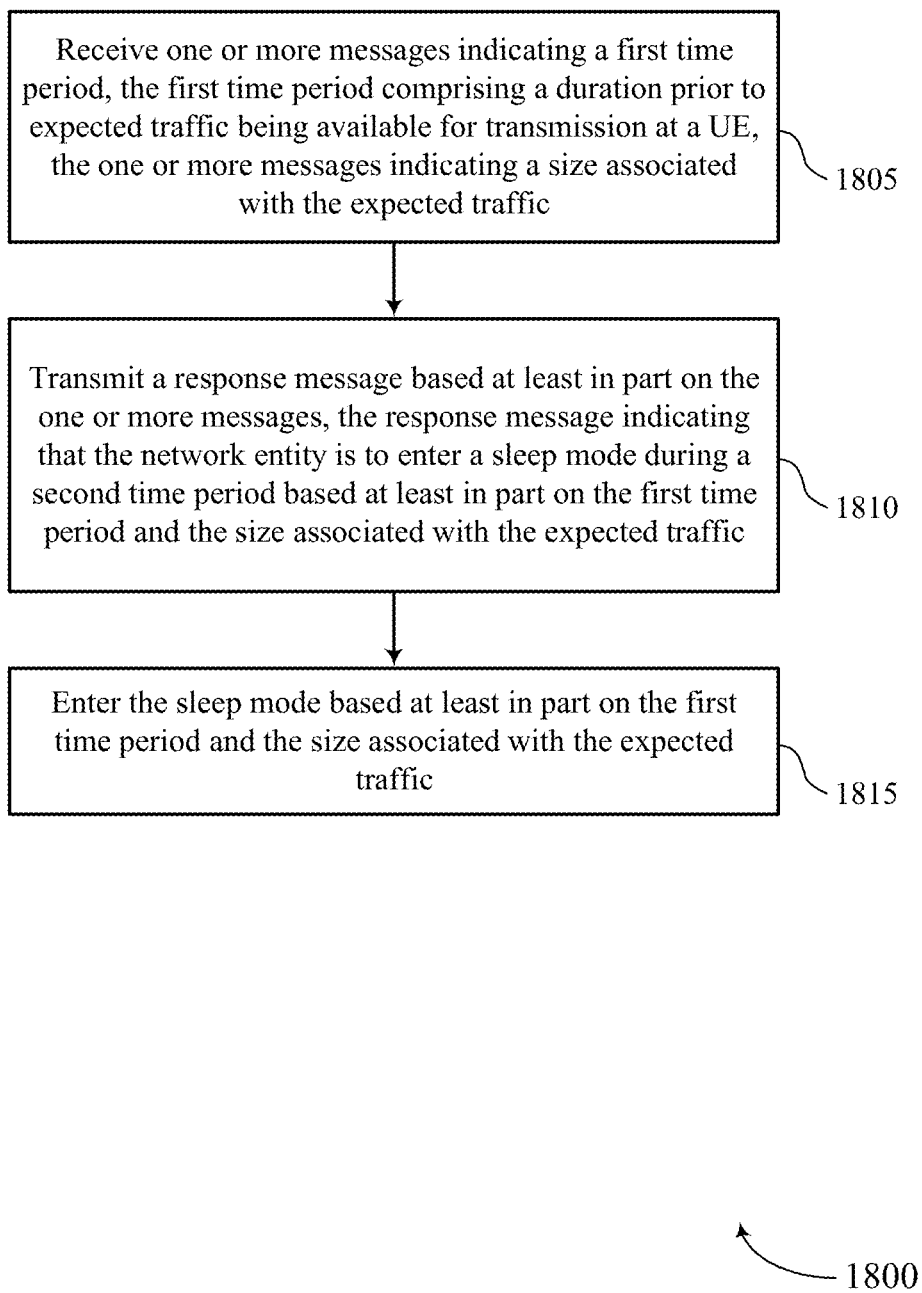

FIG. 18 shows a flowchart illustrating a method 1800 that supports UAI and BSR extension for green networks in accordance with one or more aspects of the present disclosure. The operations of the method 1800 may be implemented by a network entity or its components as described herein. For example, the operations of the method 1800 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1805, the method may include receiving one or more messages indicating a first time period, the first time period including a duration prior to expected traffic being available for transmission at a UE, the one or more messages indicating a size associated with the expected traffic. The operations of 1805 may be performed in accordance with examples as disclosed herein. In some examples, aspects of the operations of 1805 may be performed by a message reception component 1325 as described with reference to FIG. 13.

At 1810, the method may include transmitting a response message based on the one or more messages, the response message indicating that the network entity is to enter a sleep mode during a second time period based on the first time period and the size associated with the expected traffic. The operations of 1810 may be performed in accordance with examples as disclosed herein. In some examples, aspects of the operations of 1810 may be performed by a response message transmission component 1330 as described with reference to FIG. 13.

At 1815, the method may include entering the sleep mode based on the first time period and the size associated with the expected traffic. The operations of 1815 may be performed in accordance with examples as disclosed herein. In some examples, aspects of the operations of 1815 may be performed by a sleep mode component 1335 as described with reference to FIG. 13.

Figure 19:
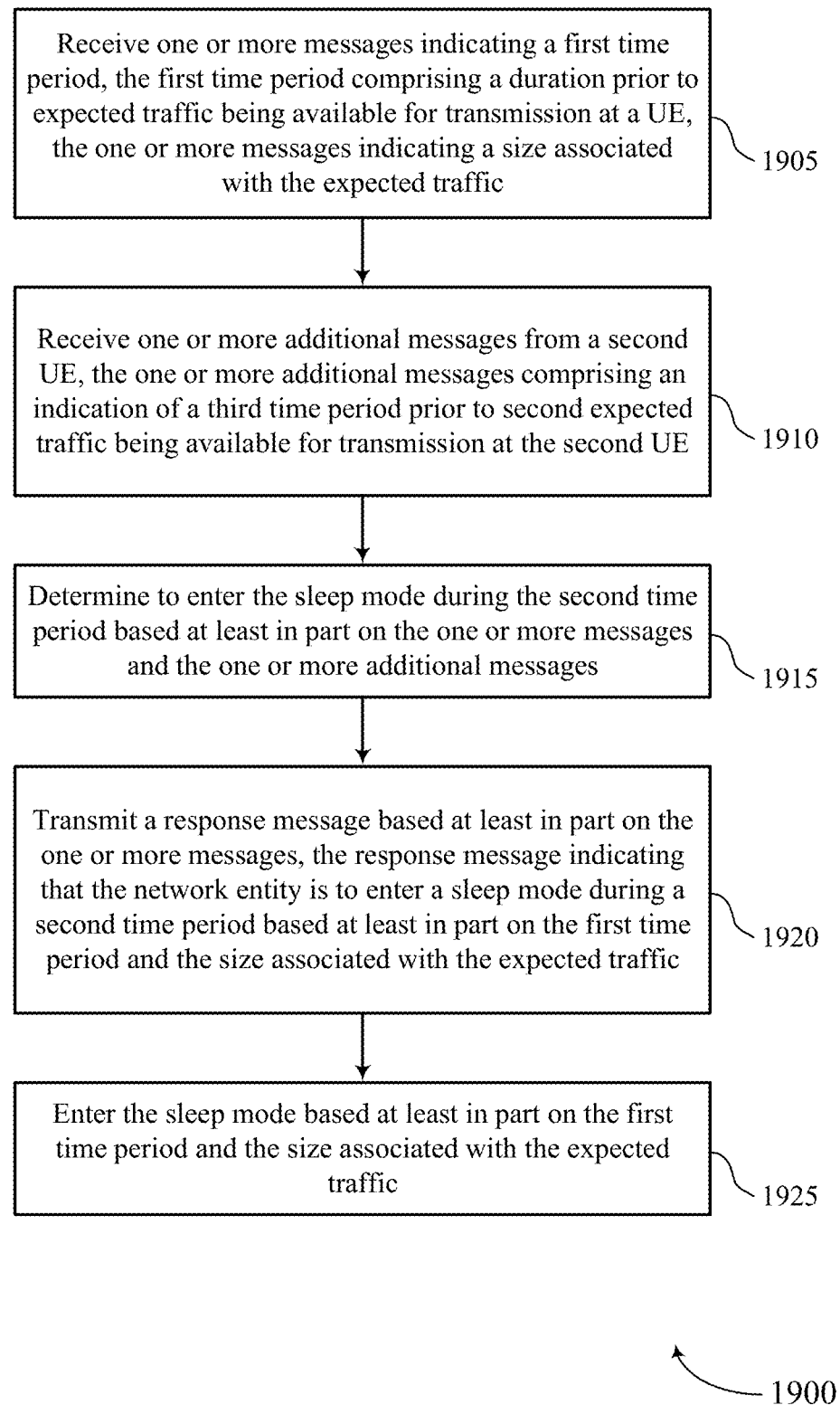

FIG. 19 shows a flowchart illustrating a method 1900 that supports UAI and BSR extension for green networks in accordance with one or more aspects of the present disclosure. The operations of the method 1900 may be implemented by a network entity or its components as described herein. For example, the operations of the method 1900 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1905, the method may include receiving one or more messages indicating a first time period, the first time period including a duration prior to expected traffic being available for transmission at a UE, the one or more messages indicating a size associated with the expected traffic. The operations of 1905 may be performed in accordance with examples as disclosed herein. In some examples, aspects of the operations of 1905 may be performed by a message reception component 1325 as described with reference to FIG. 13.

At 1910, the method may include receiving one or more additional messages from a second UE, the one or more additional messages including an indication of a third time period prior to second expected traffic being available for transmission at the second UE. The operations of 1910 may be performed in accordance with examples as disclosed herein. In some examples, aspects of the operations of 1910 may be performed by a message reception component 1325 as described with reference to FIG. 13.

At 1915, the method may include determining to enter the sleep mode during the second time period based on the one or more messages and the one or more additional messages. The operations of 1915 may be performed in accordance with examples as disclosed herein. In some examples, aspects of the operations of 1915 may be performed by a sleep mode component 1335 as described with reference to FIG. 13.

At 1920, the method may include transmitting a response message based on the one or more messages, the response message indicating that the network entity is to enter a sleep mode during a second time period based on the first time period and the size associated with the expected traffic. The operations of 1920 may be performed in accordance with examples as disclosed herein. In some examples, aspects of the operations of 1920 may be performed by a response message transmission component 1330 as described with reference to FIG. 13.

At 1925, the method may include entering the sleep mode based on the first time period and the size associated with the expected traffic. The operations of 1925 may be performed in accordance with examples as disclosed herein. In some examples, aspects of the operations of 1925 may be performed by a sleep mode component 1335 as described with reference to FIG. 13.

The following provides an overview of aspects of the present disclosure:

Aspect 1: A method for wireless communication at a UE, comprising: transmitting one or more messages indicating a first time period, the first time period comprising a duration prior to expected traffic being available for transmission at the UE, the one or more messages indicating a size associated with the expected traffic; and receiving a response message based at least in part on the one or more messages, the response message indicating that a network entity is to enter a sleep mode during a second time period based at least in part on the first time period and the size associated with the expected traffic.

Aspect 2: The method of aspect 1, wherein transmitting the one or more messages comprises: transmitting a UAI message comprising an indication of the first time period, the size associated with the expected traffic, or both.

Aspect 3: The method of any of aspects 1 through 2, further comprising: receiving a control message indicating a configuration for a field of a BSR associated with the expected traffic.

Aspect 4: The method of aspect 3, further comprising: transmitting a BSR message based at least in part on the configuration, the field of the BSR comprising an indication of the first time period, the size associated with the expected traffic, or both.

Aspect 5: The method of any of aspects 1 through 4, further comprising: receiving a control message indicating one or more parameters associated with the expected traffic, the one or more parameters comprising a BSR extension value, an expected time period prior to the expected traffic being available for transmission at the UE, a quantity of bits expected in the expected traffic, or any combination thereof.

Aspect 6: The method of any of aspects 1 through 5, wherein transmitting the one or more messages comprises: transmitting a first message that indicates both the first time period and the size associated with the expected traffic.

Aspect 7: The method of any of aspects 1 through 6, wherein transmitting the one or more messages comprises: transmitting a first message indicating the first time period; and transmitting a second message indicating the size associated with the expected traffic.

Aspect 8: The method of any of aspects 1 through 7, further comprising: detecting an arrival time associated with the expected traffic, wherein the first time period is based at least in part on the arrival time.

Aspect 9: The method of any of aspects 1 through 8, further comprising: performing one or more power saving procedures based at least in part on receiving the response message.

Aspect 10: The method of any of aspects 1 through 9, wherein the size associated with the expected traffic indicates an expected quantity of bits associated with the expected traffic.

Aspect 11: A method for wireless communication at a network entity, comprising: receiving one or more messages indicating a first time period, the first time period comprising a duration prior to expected traffic being available for transmission at a UE, the one or more messages indicating a size associated with the expected traffic; transmitting a response message based at least in part on the one or more messages, the response message indicating that the network entity is to enter a sleep mode during a second time period based at least in part on the first time period and the size associated with the expected traffic; and entering the sleep mode based at least in part on the first time period and the size associated with the expected traffic.

Aspect 12: The method of aspect 11, further comprising: receiving one or more additional messages from a second UE, the one or more additional messages comprising an indication of a third time period prior to second expected traffic being available for transmission at the second UE.

Aspect 13: The method of aspect 12, further comprising: determining to enter the sleep mode during the second time period based at least in part on the one or more messages and the one or more additional messages.

Aspect 14: The method of any of aspects 11 through 13, wherein receiving the one or more messages comprises: receiving a UAI message comprising an indication of the first time period, the size associated with the expected traffic, or both.

Aspect 15: The method of any of aspects 11 through 14, further comprising: receiving a control message indicating a configuration for a field of a BSR associated with the expected traffic.

Aspect 16: The method of aspect 15, further comprising: receiving a BSR message based at least in part on the configuration, the field of the BSR indicating the first time period prior to the expected traffic being available for transmission at the UE, the size associated with the expected traffic, or both.

Aspect 17: The method of any of aspects 11 through 16, further comprising: transmitting a control message indicating one or more parameters associated with the expected traffic, the one or more parameters comprising a BSR extension value, an expected time period prior to the expected traffic being available for transmission at the UE, a quantity of bits expected in the expected traffic, or any combination thereof.

Aspect 18: The method of any of aspects 11 through 17, wherein receiving the one or more messages comprises: receiving a first message that indicates both the first time period and the size associated with the expected traffic.

Aspect 19: The method of any of aspects 11 through 18, wherein receiving the one or more messages comprises: receiving a first message indicating the first time period; and receiving a second message indicating the size associated with the expected traffic.

Aspect 20: The method of any of aspects 11 through 19, wherein the size associated with the expected traffic indicates an expected quantity of bits associated with the expected traffic.

Aspect 21: An apparatus for wireless communication at a UE, comprising a processor; memory coupled with the processor; and instructions stored in the memory and executable by the processor to cause the apparatus to perform a method of any of aspects 1 through 10.

Aspect 22: An apparatus for wireless communication at a UE, comprising at least one means for performing a method of any of aspects 1 through 10.

Aspect 23: A non-transitory computer-readable medium storing code for wireless communication at a UE, the code comprising instructions executable by a processor to perform a method of any of aspects 1 through 10.

Aspect 24: An apparatus for wireless communication at a network entity, comprising a processor; memory coupled with the processor; and instructions stored in the memory and executable by the processor to cause the apparatus to perform a method of any of aspects 11 through 20.

Aspect 25: An apparatus for wireless communication at a network entity, comprising at least one means for performing a method of any of aspects 11 through 20.

Aspect 26: A non-transitory computer-readable medium storing code for wireless communication at a network entity, the code comprising instructions executable by a processor to perform a method of any of aspects 11 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    transmitting one or more messages indicating a first time period, the first time period comprising a duration prior to expected traffic being available for transmission at the UE, the one or more messages indicating a size associated with the expected traffic; and
    receiving a response message based at least in part on the one or more messages, the response message indicating that a network entity is to enter a sleep mode during a second time period based at least in part on the first time period and the size associated with the expected traffic.

2. The method of claim 1, wherein transmitting the one or more messages comprises:
    transmitting a UE assistance information message comprising an indication of the first time period, the size associated with the expected traffic, or both.

3. The method of claim 1, further comprising:
    receiving a control message indicating a configuration for a field of a buffer status report associated with the expected traffic.

4. The method of claim 3, further comprising:
    transmitting a buffer status report message based at least in part on the configuration, the field of the buffer status report comprising an indication of the first time period, the size associated with the expected traffic, or both.

5. The method of claim 1, further comprising:
    receiving a control message indicating one or more parameters associated with the expected traffic, the one or more parameters comprising a buffer status report extension value, an expected time period prior to the expected traffic being available for transmission at the UE, a quantity of bits expected in the expected traffic, or any combination thereof.

6. The method of claim 1, wherein transmitting the one or more messages comprises:
    transmitting a first message that indicates both the first time period and the size associated with the expected traffic.

7. The method of claim 1, wherein transmitting the one or more messages comprises:
    transmitting a first message indicating the first time period; and
    transmitting a second message indicating the size associated with the expected traffic.

8. The method of claim 1, further comprising:
    detecting an arrival time associated with the expected traffic, wherein the first time period is based at least in part on the arrival time.

9. The method of claim 1, further comprising:
    performing one or more power saving procedures based at least in part on receiving the response message.

10. The method of claim 1, wherein the size associated with the expected traffic indicates an expected quantity of bits associated with the expected traffic.

11. A method for wireless communication at a network entity, comprising:
    receiving one or more messages indicating a first time period, the first time period comprising a duration prior to expected traffic being available for transmission at a user equipment (UE), the one or more messages indicating a size associated with the expected traffic;
    transmitting a response message based at least in part on the one or more messages, the response message indicating that the network entity is to enter a sleep mode during a second time period based at least in part on the first time period and the size associated with the expected traffic; and
    entering the sleep mode based at least in part on the first time period and the size associated with the expected traffic.

12. The method of claim 11, further comprising:
receiving one or more additional messages from a second UE, the one or more additional messages comprising an indication of a third time period prior to second expected traffic being available for transmission at the second UE.

13. The method of claim 12, further comprising:
determining to enter the sleep mode during the second time period based at least in part on the one or more messages and the one or more additional messages.

14. The method of claim 11, wherein receiving the one or more messages comprises:
receiving a UE assistance information message comprising an indication of the first time period, the size associated with the expected traffic, or both.

15. The method of claim 11, further comprising:
receiving a control message indicating a configuration for a field of a buffer status report associated with the expected traffic.

16. The method of claim 15, further comprising:
receiving a buffer status report message based at least in part on the configuration, the field of the buffer status report indicating the first time period prior to the expected traffic being available for transmission at the UE, the size associated with the expected traffic, or both.

17. The method of claim 11, further comprising:
transmitting a control message indicating one or more parameters associated with the expected traffic, the one or more parameters comprising a buffer status report extension value, an expected time period prior to the expected traffic being available for transmission at the UE, a quantity of bits expected in the expected traffic, or any combination thereof.

18. The method of claim 11, wherein receiving the one or more messages comprises:
receiving a first message that indicates both the first time period and the size associated with the expected traffic.

19. The method of claim 11, wherein receiving the one or more messages comprises:
receiving a first message indicating the first time period; and
receiving a second message indicating the size associated with the expected traffic.

20. The method of claim 11, wherein the size associated with the expected traffic indicates an expected quantity of bits associated with the expected traffic.

21. An apparatus for wireless communication at a user equipment (UE), comprising:
a processor;
memory coupled with the processor; and
instructions stored in the memory and executable by the processor to cause the apparatus to:
transmit one or more messages indicating a first time period, the first time period comprising a duration prior to expected traffic being available for transmission at the UE, the one or more messages indicating a size associated with the expected traffic; and
receive a response message based at least in part on the one or more messages, the response message indicating that a network entity is to enter a sleep mode during a second time period based at least in part on the first time period and the size associated with the expected traffic.

22. The apparatus of claim 21, wherein the instructions to transmit the one or more messages are executable by the processor to cause the apparatus to:
transmit a UE assistance information message comprising an indication of the first time period, the size associated with the expected traffic, or both.

23. The apparatus of claim 21, wherein the instructions are further executable by the processor to cause the apparatus to:
receive a control message indicating a configuration for a field of a buffer status report associated with the expected traffic.

24. The apparatus of claim 23, wherein the instructions are further executable by the processor to cause the apparatus to:
transmit a buffer status report message based at least in part on the configuration, the field of the buffer status report comprising an indication of the first time period, the size associated with the expected traffic, or both.

25. The apparatus of claim 21, wherein the instructions are further executable by the processor to cause the apparatus to:
receive a control message indicating one or more parameters associated with the expected traffic, the one or more parameters comprising a buffer status report extension value, an expected time period prior to the expected traffic being available for transmission at the UE, a quantity of bits expected in the expected traffic, or any combination thereof.

26. An apparatus for wireless communication at a network entity, comprising:
a processor;
memory coupled with the processor; and
instructions stored in the memory and executable by the processor to cause the apparatus to:
receive one or more messages indicating a first time period, the first time period comprising a duration prior to expected traffic being available for transmission at a user equipment (UE), the one or more messages indicating a size associated with the expected traffic;
transmit a response message based at least in part on the one or more messages, the response message indicating that the network entity is to enter a sleep mode during a second time period based at least in part on the first time period and the size associated with the expected traffic; and
enter the sleep mode based at least in part on the first time period and the size associated with the expected traffic.

27. The apparatus of claim 26, wherein the instructions are further executable by the processor to cause the apparatus to:
receive one or more additional messages from a second UE, the one or more additional messages comprising an indication of a third time period prior to second expected traffic being available for transmission at the second UE.

28. The apparatus of claim 27, wherein the instructions are further executable by the processor to cause the apparatus to:
determine to enter the sleep mode during the second time period based at least in part on the one or more messages and the one or more additional messages.

29. The apparatus of claim 26, wherein the instructions to receive the one or more messages are executable by the processor to cause the apparatus to:

receive a UE assistance information message comprising an indication of the first time period, the size associated with the expected traffic, or both.

30. The apparatus of claim 26, wherein the instructions are further executable by the processor to cause the apparatus to:

receive a control message indicating a configuration for a field of a buffer status report associated with the expected traffic.

* * * * *